(12) United States Patent
Corsin et al.

(10) Patent No.: US 11,531,460 B2
(45) Date of Patent: Dec. 20, 2022

(54) AUTOMATIC POSITIONING OF CONTENT ITEMS IN A SCROLLING DISPLAY FOR OPTIMAL VIEWING OF THE ITEMS

(71) Applicant: Twitter, Inc., San Francisco, CA (US)

(72) Inventors: Simon Corsin, New York, NY (US); Richard Arnold, Hoboken, NJ (US); Michel Loenngren, Brooklyn, NY (US); Kevin Markman, New York, NY (US); Jason J. Mante, New York, NY (US); Adam Feldman, New York, NY (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 17/247,426

(22) Filed: Dec. 10, 2020

(65) Prior Publication Data

US 2021/0096714 A1    Apr. 1, 2021

Related U.S. Application Data

(62) Division of application No. 15/791,793, filed on Oct. 24, 2017, now Pat. No. 10,891,044.

(60) Provisional application No. 62/412,644, filed on Oct. 25, 2016.

(51) Int. Cl.
*G06F 3/0485* (2022.01)
*G06F 3/0488* (2022.01)
*G06F 3/04883* (2022.01)
*G06T 13/80* (2011.01)

(52) U.S. Cl.
CPC ........ *G06F 3/0485* (2013.01); *G06F 3/04883* (2013.01); *G06F 2203/04808* (2013.01); *G06T 13/80* (2013.01); *G06T 2200/24* (2013.01)

(58) Field of Classification Search
CPC .............. G06F 3/0485; G06F 3/04883; G06F 2203/04808; G06T 13/80; G06T 2200/24
See application file for complete search history.

(56) References Cited

U.S. PATENT DOCUMENTS

| | | | | |
|---|---|---|---|---|
| 9,229,918 B2* | 1/2016 | Zaman | ................. | G06F 3/0488 |
| 10,025,396 B2* | 7/2018 | Fan | ........................ | G06F 3/0485 |
| 10,120,452 B2* | 11/2018 | Yoshida | .................. | G06F 3/041 |
| 10,126,931 B2* | 11/2018 | Min | ....................... | G06F 3/0485 |
| 10,552,032 B2* | 2/2020 | Lippolis | .............. | G06F 3/04883 |
| 10,891,044 B1* | 1/2021 | Corsin | .................. | G06F 3/0485 |

(Continued)

*Primary Examiner* — Daeho D Song
(74) *Attorney, Agent, or Firm* — Brake Hughes Bellermann LLP

(57) ABSTRACT

Systems and methods are described that include providing, on a touchscreen display of an electronic device, a stream of content items, at least some of which are associated with a corresponding display anchor. Inputs are detected at the touchscreen display and the inputs are associated with a scroll speed. The scroll speed may be based on a detected distance between the inputs on the touchscreen and an elapsed time between at least two of the inputs. In response to determining a lack of input for a predefined time period, a display anchor can be determined and selected. The display anchor may correspond to a content item to be used as a pause location for the stream. The scrolling of the stream of content items can be paused at the pause location to use the selected display anchor to display the content item in a top viewable portion of the display.

17 Claims, 12 Drawing Sheets

(56) References Cited

U.S. PATENT DOCUMENTS

| | | | |
|---|---|---|---|
| 2006/0256138 A1* | 11/2006 | Haneda | G09G 5/343 345/684 |
| 2007/0132789 A1* | 6/2007 | Ording | G06F 3/0485 345/684 |
| 2008/0309632 A1* | 12/2008 | Westerman | G06F 3/0485 345/173 |
| 2010/0146387 A1* | 6/2010 | Hoover | G06F 3/0485 715/702 |
| 2010/0235794 A1* | 9/2010 | Ording | G06F 3/0488 715/863 |
| 2011/0074699 A1* | 3/2011 | Marr | G06F 3/04842 345/173 |
| 2011/0161864 A1* | 6/2011 | Nagasaka | G01C 21/367 715/784 |
| 2011/0227948 A1* | 9/2011 | Ushida | G01C 21/367 345/173 |
| 2012/0056850 A1* | 3/2012 | Kasahara | G06F 3/044 345/173 |
| 2012/0102400 A1* | 4/2012 | Worley | G06F 3/0488 715/702 |
| 2012/0147052 A1* | 6/2012 | Homma | G06F 3/04883 345/174 |
| 2012/0169670 A1* | 7/2012 | Kim | G06F 3/04883 345/175 |
| 2012/0174005 A1* | 7/2012 | Deutsch | G06F 3/04817 715/764 |
| 2012/0218203 A1* | 8/2012 | Kanki | G06F 3/0488 345/173 |
| 2012/0218310 A1* | 8/2012 | Shinohara | G09G 5/34 345/670 |
| 2012/0319948 A1* | 12/2012 | Kim | G06F 3/04883 345/158 |
| 2013/0111396 A1* | 5/2013 | Brid | G06F 3/04855 715/784 |
| 2013/0179830 A1* | 7/2013 | Lee | H04M 1/72469 715/784 |
| 2013/0268883 A1* | 10/2013 | Kim | G06F 3/04847 715/784 |
| 2013/0325844 A1* | 12/2013 | Plaisant | G06F 16/3323 707/E17.014 |
| 2013/0326398 A1* | 12/2013 | Zuverink | G06F 3/0488 715/830 |
| 2014/0055395 A1* | 2/2014 | Kim | G06F 3/0485 345/173 |
| 2014/0258854 A1* | 9/2014 | Li | H04N 21/414 715/702 |
| 2014/0279308 A1* | 9/2014 | Ogawa | G06Q 40/12 705/30 |
| 2014/0282224 A1* | 9/2014 | Pedley | G06F 3/017 715/784 |
| 2015/0350735 A1* | 12/2015 | Köser | H04N 21/2743 725/37 |
| 2016/0004403 A1* | 1/2016 | Lee | G06F 3/0488 345/156 |
| 2016/0034152 A1* | 2/2016 | Wilson | G06F 3/0482 715/835 |
| 2016/0035119 A1* | 2/2016 | Lee | G06F 3/04817 345/473 |
| 2016/0042721 A1* | 2/2016 | Kim | G06F 3/04883 345/684 |
| 2016/0070429 A1* | 3/2016 | Clark | G06F 3/0482 715/784 |
| 2016/0077631 A1* | 3/2016 | Yamamoto | G06F 3/04883 345/174 |
| 2016/0124597 A1* | 5/2016 | Nagata | G06F 3/0488 345/173 |
| 2016/0202768 A1* | 7/2016 | Yoshida | G06F 3/017 345/156 |
| 2016/0357305 A1* | 12/2016 | Wells | G06F 3/04842 |
| 2016/0357382 A1* | 12/2016 | Metz | G06F 3/04883 |
| 2017/0046024 A1* | 2/2017 | Dascola | G06F 3/04886 |
| 2017/0052632 A1* | 2/2017 | Kamamori | G06F 3/0425 |
| 2017/0075533 A1* | 3/2017 | Schaad | G06F 3/0485 |
| 2017/0118402 A1* | 4/2017 | Bok | G06F 3/04883 |
| 2017/0357398 A1* | 12/2017 | Alonso-Ruiz | G06F 3/0484 |
| 2018/0075034 A1* | 3/2018 | Wang | G06F 16/24578 |
| 2019/0065442 A1* | 2/2019 | Rommel | G06F 40/114 |
| 2019/0147503 A1* | 5/2019 | Burriesci | G06Q 30/0277 705/14.73 |
| 2019/0166759 A1* | 6/2019 | Johnson | A01D 41/1217 |

\* cited by examiner

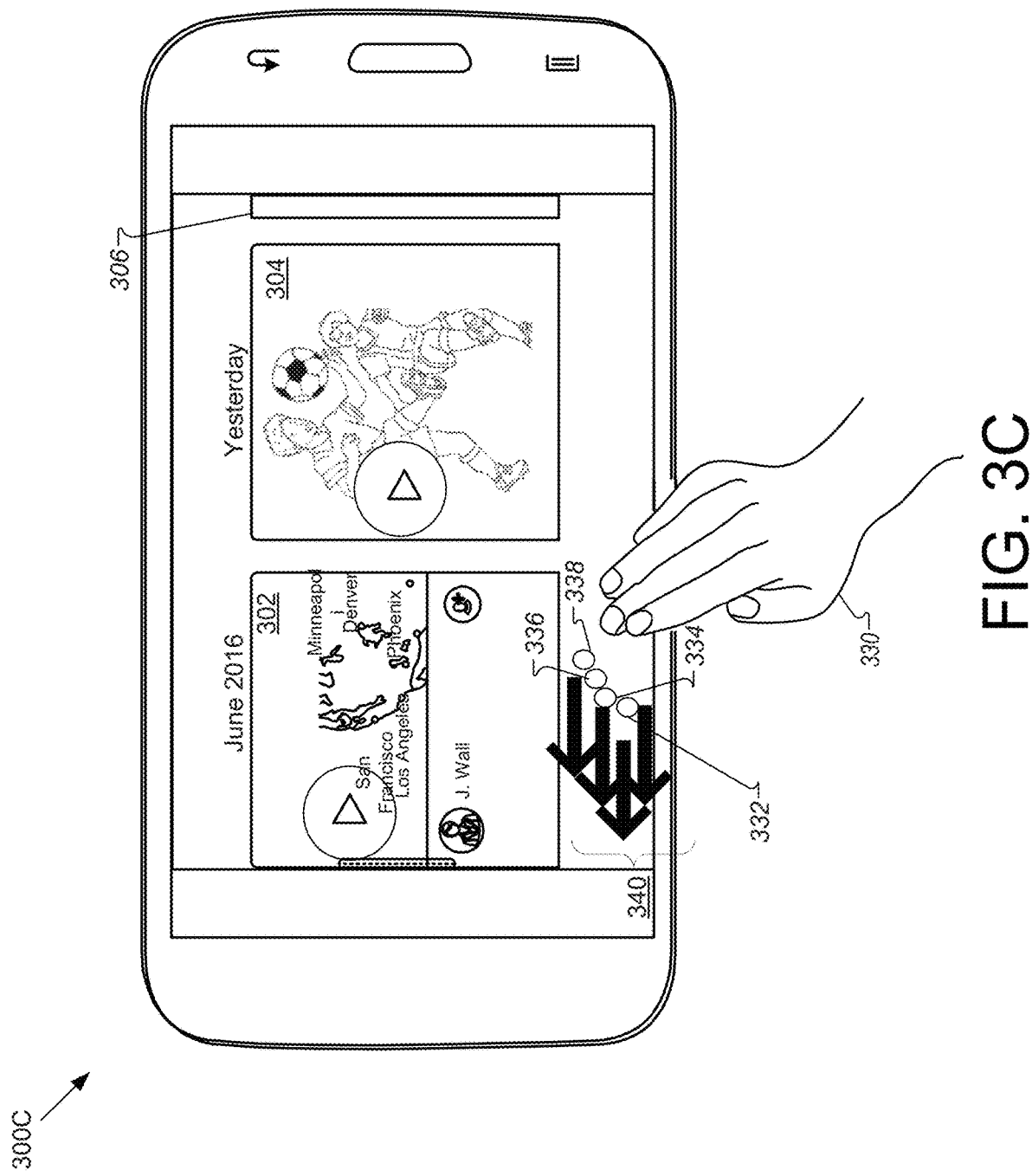

AUTOMATIC POSITIONING OF CONTENT ITEMS IN A SCROLLING DISPLAY FOR OPTIMAL VIEWING OF THE ITEMS

CROSS REFERENCE TO RELATED APPLICATIONS

This application is a divisional of, and claims priority to, U.S. patent application Ser. No. 15/791,793, filed on Oct. 24, 2017, which claims priority to, and the benefit of, U.S. Provisional Application No. 62/412,644, filed on Oct. 25, 2016, the disclosures of which are incorporated by reference herein in their entirety.

This application also claims priority to, and the benefit of, U.S. Provisional Application No. 62/412,644, filed on Oct. 25, 2016, the entirety of which is herein incorporated by reference.

TECHNICAL FIELD

This description generally relates to positioning and displaying scrollable content in a display of an electronic device.

BACKGROUND

Some webpages may display a number of discrete content items, such as pictures and paragraphs of text. The number of content items on the page can be large enough so that not all the content items can be displayed at the same time. Therefore, it is possible for a user to scroll through the content items to bring different items into view. Such a scrolling page of content items can be known as a content feed. Content feeds can include content provided by the user, content provided by other users, or content provided by both the user and other users.

SUMMARY

The techniques, methods, and systems disclosed herein can automatically position content items in a convenient viewing location on an electronic device screen based on detected user input. In particular, the content items can be positioned in a display in such a manner that avoids placing a particular content item partly on the screen and partly off of the screen. For example, if a user scrolls content items on the electronic device screen, content can inadvertently be placed partially off of the screen as a scrolling motion slows and comes to rest. The user may have to adjust the content by performing additional input to view a beginning or ending portion of the content. The techniques, methods, and systems disclosed herein can detect one or more inputs and associated input speeds (e.g., pertaining to scroll speed) to determine convenient content item placement within the screen. For example, if the user is scrolling at a speed below a threshold speed (e.g., a slow scroll speed), the electronic device can scroll in response to user input and can continue to scroll content if additional input is detected and can slow to a stop/pause when input is undetected. In this example, the scroll stop/pause location may be adjusted to ensure that content of the content item is displayed at a convenient reading location within the device screen. Such a convenient reading location may be at a top or left edge of the device screen such that a beginning portion of the content item (e.g., a top portion) can be viewed by the user and the remainder of the content item can be depicted within the screen. In this example, the systems described herein can slide the beginning portion of the content item to a top or left edge of the device screen, which may be viewed by the user as a snapping of content to the top or left edge of the device screen. In addition, each time an input is received, additional content can be scrolled and upon detecting a lack of scroll input, another content item can be automatically placed (e.g., snapped) at the top or left edge of the device screen based on the input.

In operation, the systems described herein can be preconfigured with scroll speed thresholds to engage or disengage the snapping of content items for a particular content feed of content items. In addition, the systems described herein may be configured with algorithms for selecting particular scroll pause locations upon detecting a lack of user input. Such scroll pause locations can be selected while receiving scroll input or after detecting scroll input has ceased. In one non-limiting example, if a user is scrolling at a particularly fast speed, content items can be scrolled, and several content items may be scrolled off of the screen until scroll input is no longer detected. The systems described herein can select a pause location based on the content feed, scroll speed, and location of beginning or ending points for one or more content items in the content feed. In such an example, the electronic device can begin to slow scrolling until a threshold speed is reached, at which point, a pause location can be selected while the scrolling continues to slow. If no further input is detected, the pause location can be engaged and the scroll of the content can come to rest at the pause location. The content associated with the pause location can be aligned at the top or left edge of the electronic device screen.

In one general aspect, a system is described that may include one or more computers which can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In another general aspect, a method is described that includes providing, on a touchscreen display of an electronic device, a stream of content items, at least some of which are associated with a corresponding display anchor. Inputs can be detected at the touchscreen display and the inputs can be associated with a scroll speed. The scroll speed may be based on a detected distance between the inputs on the touchscreen and an elapsed time between at least two of the inputs. In response to determining a lack of input for a predefined time period, a display anchor can be determined and selected. The display anchor may correspond to a content item to be used as a pause location for the stream. The scrolling of the stream of content items can be paused at the pause location such that the content item corresponding to the selected display anchor is displayed in a top viewable portion of the display.

Implementations may include one or more of the following features. In some implementations, the content item corresponding to the selected display anchor may be displayed in its entirety on the touchscreen display. The pause may be sustained at least until detecting an additional input to the touchscreen display. In some implementations, the method may also include determining and selecting at least one additional display anchor, as a second pause location in response to receiving additional input on the touchscreen and pausing the scrolling of the plurality of inputs at the second pause location. This may include receiving a plurality of subsequent inputs, determining a scroll behavior based on gestures associated with a portion of the plurality of subsequent inputs, and in response to detecting a change in scroll behavior, the method can include adjusting the predefined time period and storing the adjusted predefined time period for the electronic device.

In some implementations, the method may include a feature in which the elapsed time between at least two of the plurality of inputs is a determined value corresponding to an average scroll speed for a plurality of users interacting with an application presenting streams of content items. The method may also include executing a messaging platform application on the electronic device. The messaging platform application may present the stream of content items. In some implementations, the messaging platform application displays the stream of content items in a timeline. The timeline may be in a chronological time order in which the content items are submitted to the messaging platform application. In some implementations, the plurality of inputs corresponds to a first touch location on the touchscreen display and a lateral movement in a horizontal direction through the stream of content items horizontally displayed in the touchscreen display. The horizontal may be described as perpendicular to a wide edge of the touchscreen display or a second touch location on the touchscreen display and a vertical movement through the stream of content items vertically displayed in the touchscreen display in which the vertical is parallel to the wide edge of the touchscreen display. Implementations of the described techniques may include hardware, a method or process, or computer software on a computer-accessible medium. For example, the method may use a system that includes at least one processor, a display device, and memory storing instructions that, when executed by the at least one processor, generate a user interface for performing aspects of the methods described herein.

In another general aspect, a method is described that includes detecting a sequence of scroll gestures performed by a user on a touchscreen display in an electronic device. In some implementations, the sequence of scroll gestures includes a plurality of single finger selections on the touchscreen display. In some implementations, the sequence of scroll gestures includes a plurality of multi-finger selections on the touchscreen display. At least a portion of the sequence of scroll gestures may include a contact location, a movement direction, and a release speed. In response to receiving at least one gesture in the sequence, the method can include executing scrolling of a plurality of interactive posts in the display of the electronic device. In response to receiving a second and third gesture in the sequence, the method can include determining whether one or more of the release speeds corresponding to the second and third gestures is at or below a predefined threshold speed.

The method may also include engaging a scroll animation for at least one of the interactive posts in response to detecting that at least one release speed corresponds to at least one of the second or third gestures being at or below the predefined threshold speed. The method may also include pausing the plurality of interactive posts according to the scroll animation. The scroll animation may include selecting and arranging at least one interactive post in the scrolling interactive posts in the display of the electronic device to begin at an edge of a viewable display area of the display of the electronic device after detecting a release speed for each respective scroll gesture. In some implementations, the release speed defines a speed at which the user removes a touch input from the touchscreen display.

In some implementations, the scroll animation for the interactive posts is configured to pause the scrolling of interactive posts by selecting a display anchor associated with at least one of the interactive posts scrollable in the display of the electronic device and moving the selected display anchor to an edge of a viewable portion of the display of the electronic device such that the content begin portion is aligned with the edge to provide a top portion of the at least one interactive post in the display of the electronic device. In some implementations, the display anchor defines a content beginning or ending portion of the at least one interactive post.

Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

FIGS. 3A-3D are schematic diagrams illustrating an example graphical user interface enabling users to scroll content.

Like reference symbols in the various drawings indicate like elements.

DETAILED DESCRIPTION

Figure 1A:
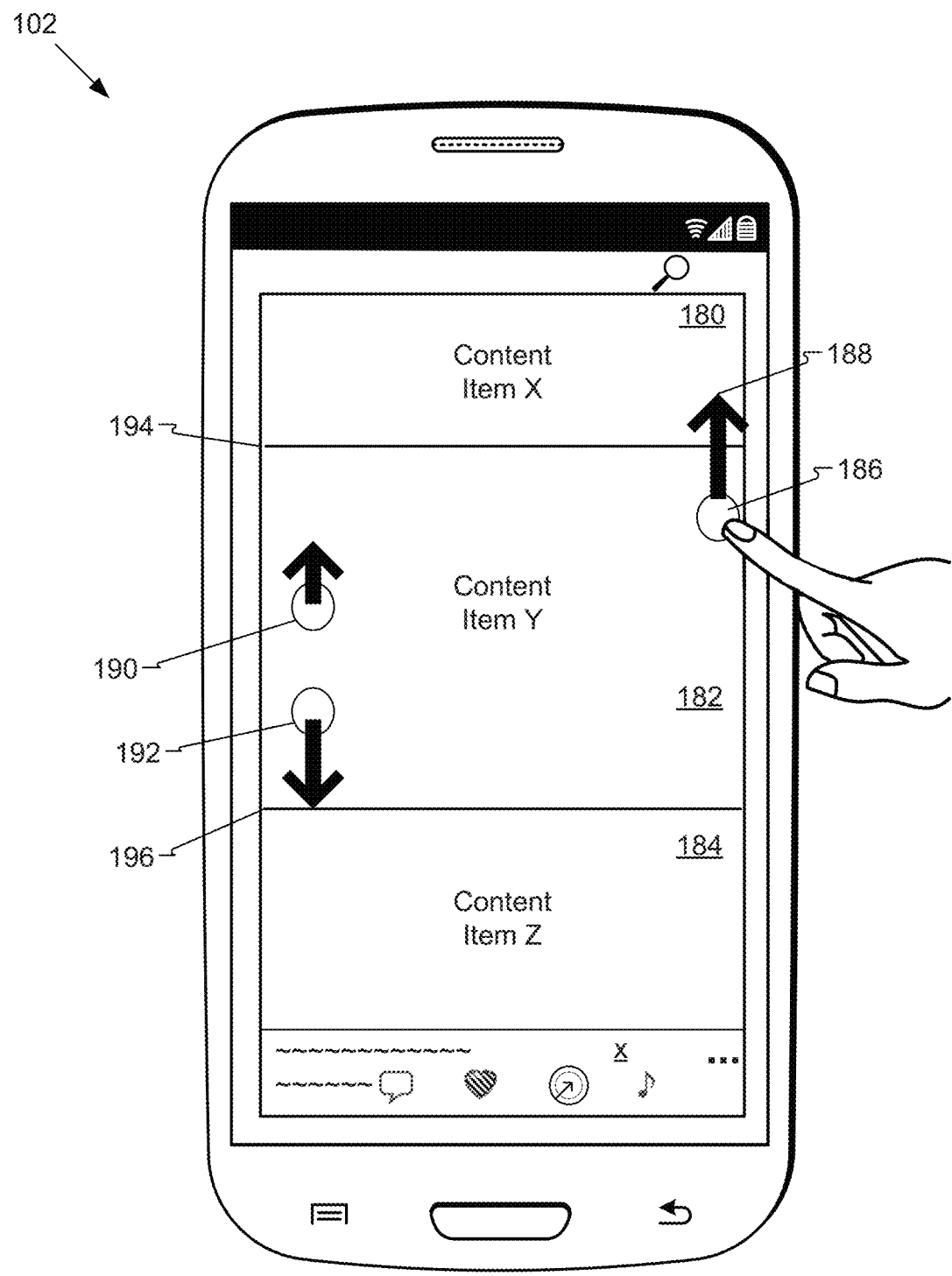
FIGS. 1A-1B illustrate an example of a system that can be used for accessing, scrolling, and positioning content items.

Users can post content items (i.e., content) including, but not limited to, blog entries, photos, symbols, videos, comments, tweets, messages, and location data using one or more social media platforms or other Internet connected resource. The content can be provided in windows, panes, or applications configured to present data in timelines, feeds, or other organized fashion in which a user can upload and/or access content on electronic computing devices. Media users may prefer to update and share information from a mobile computing device, such as a smart phone and/or wearable devices such as glasses and watches, or tablets, and the like. Such devices, because of their size, often operate with limited display resources in comparison to full size electronic devices. For example, input methods and screen real estate may play a role in how content can be viewed by a user accessing and scrolling through such content on a mobile computing device.

When content items are displayed in a scrolling content feed, a particular content item may be partially displayed in a display screen of an electronic computing device, as a scroll comes to a halt. The portion that is displayed on a screen of the computing device may be a central portion of the content or other snippet. The user may view the portion or snippet, but may be better served to begin viewing the content item at the beginning of the content in the content item.

The techniques, methods, and systems disclosed herein can automatically position content items in a convenient viewing location on an electronic computing device screen, based on detected user input. For example, the content items can be positioned in a scrolling display in such a manner that avoids placing the items partly on the screen and partly off of the screen. The positioning can be performed in response to receiving a user input that triggers a modification to the scroll speed and/or direction. In some implementations, the user input may be provided in a location on the screen to pause the scrolling motion of the content feed/stream. The user input may be a scrolling gesture or tapping gesture on the device screen and each input may indicate how to move (e.g., scroll) the content items.

User input can include, but is not limited to a touch, a swipe, a pinch, a scroll, a pressing motion, or other movement performable by a user using a controller, a detectable gesture, a finger, fingers, or hands or other body part or device capable of interacting with a computing device that is providing content. In some implementations, the gestures may include multi-finger gestures. In some implementations, the gestures may include single finger gestures. In some implementations, the gestures may include hand gestures including, but not limited to swiping gestures (e.g., vertical or horizontal swiping), flicking gestures. In some implementations, the input described herein may include a horizontal scroll gesture or a vertical scroll gesture. The user may scroll upward, downward, leftward, rightward, or other direction provided within an interface of an electronic device (e.g., a mobile computing device). In some implementations, the input described herein may be a hover gesture detectable by an electronic device to trigger scrolling of content.

In some implementations, the input can be used to trigger determination of a location in which to temporarily pause content items into view to ensure that the user is provided with a view of the content item depicting the beginning of the content in the content item. The pause of the content may be temporary and can be provided as an animation that appears to magnetically snap the beginning of the content item into place within a display of a computing device. This can provide the advantage of allowing the user to view content from the beginning without having to re-scroll up or down or left or right to find the beginning of the content. The pause or snap location may be based on one or more variables associated with user input. The one or more variables may include any or all of scroll speed, swipe speed, touchscreen display contact location, a direction of movement associated with a scroll gesture or input, a time between received inputs, and/or a release speed associated with a scroll gesture or input.

In one non-limiting example, the systems disclosed herein can detect any number of user-initiated inputs on a mobile computing device. The systems can use such inputs to ascertain how the user is interacting with content with the mobile computing device. For example, the systems disclosed herein can determine a scrolling speed associated with one or more user inputs. Upon detecting that the user is no longer providing the input (e.g., to scroll through items of the content feed), the systems can use the previously detected scrolling speed to select a content item in which to focus upon in the display. The selected content item may be displayed with a beginning portion of the content placed at or near the top of a viewable area on a display screen of a mobile computing device, in the event that the user input is in a vertical direction on the screen of the mobile computing device. Similarly, the selected content item may be displayed with the beginning of the content placed at or near the left side of a viewable area on the display screen of the mobile computing device, in the event that the user input is in a horizontal direction on the screen of the mobile computing device. The content item may be selected based on determining a stopping location associated with the scroll speed. The stopping location may be calculated based on a speed of scroll divided by a distance particular content is scrolled. The stopping location can be used as a basis for stopping the scrolled content and aligning such content in a specific viewable area within the display screen of the mobile computing device.

The techniques, methods, and systems disclosed herein can provide an advantage of enabling convenient placement of content for a user quickly scrolling through her feed for any of her TWITTER tweets, FACEBOOK status updates, GOOGLE BUZZ status updates, VINE loops, INSTAGRAM content, and the like. For example, as content scrolls with each scroll input through a touchscreen display, for example, the systems described herein can detect when a scrolling gesture is no longer being applied to the touchscreen and can place content (e.g., news, photos, videos, advertisements, etc.) at a predictable and convenient place within a display screen based on the speed and time of particular received input, rather than placing the content in a random place as the scrolled content comes to rest. For example, the scrolling content can be snapped to a pixel location positioned at the top of the display of a mobile computing device using the systems and methods described herein.

FIG. 1A is an example diagram of a computing device 102 with a graphical user interface that can be used for accessing, scrolling, and positioning content items. In the depicted example computing device 102, content is shown in a content stream. The content stream can include any number of scrollable content items in which the user can view upon scrolling by selecting on a touchscreen of device 102, for example. The example device 102 depicts a partial content item 180 (e.g., Content Item X, in which a beginning portion is not shown), a content item 182 (e.g., Content Item Y), and a partial content item 184 (e.g., Content Item Z, in which an end portion is not shown). The content items 180, 182, and 184 are displayed in the viewable area of the touchscreen and additional content can be viewed by scrolling up or down through a stream of content items.

In this example, a user may be scrolling content by selecting the touchscreen and moving upward (e.g., swiping at location 186) to scroll the stream of content items in the direction of arrow 188. The user may swipe the touchscreen once or several times to scroll at different rates. The swipe gesture may be associated with a swipe speed. In one example, the user may scroll with a finger swipe in which the scroll of content items follows the timing of the user movement exactly such that the swipe speed matches the speed of the user's finger. In another example, the user may scroll by swiping several times on the touchscreen. Such a movement may trigger a free scroll of content in which content items move even when the user's finger is not contacting the touchscreen. In this mode, the automatic pause animation may not be engaged. However, if the user swipes to induce a high speed scrolling of the content items, the automatic pause animation may be triggered.

In operation, when the user swipes, a succession of content items move into and out of view, as scrolling occurs. If the user swipes multiple times consecutively (e.g., two or more) to increase the scroll speed, the movement of content items across the display of device 102 may increase. With the increased speed, the device 102 can select and engage a pause location to temporarily pause the scroll to display a particular content item.

In some implementations, the scroll speed may also depend upon a time elapsed between a first input and a second input on the touchscreen. For example, determining a scroll speed associated with two or more inputs may include detecting times for each touch input and calculating an elapsed time between each successive input. The elapsed time can be used as a basis to increase or decrease scroll speed. The elapsed time can also be used as a basis to engage or disengage a particular scroll animation, such as pausing on content items to display one or more content items in a readable and convenient fashion for the user of the touchscreen display. In addition, if several seconds have elapsed between inputs, the device 102 can trigger a gradual slowing and stopping of the scrolling of content items.

In general, received input at the touchscreen of computing device 102 can engage device 102 to detect and interpret scroll motions (e.g., inputs, scroll gestures, points of contact, etc.). The device 102 can detect each point of contact and one or more times at which each input (e.g., point of contact) is made. Each time an input is received, device 102 can detect a point of contact associated with the input and can calculate elapsed time between one or more successive inputs. For example, the user can select location 186 (e.g., representing a point of contact) on the touchscreen and swipe upward to move content up and off the display area of the touchscreen while new content scrolls upward to replace the content moving off of the display area of the touchscreen. If the user touches the touchscreen again, the scrolling can follow the user input and device 102 can calculate the elapsed time between the first input and the new input. The user can increase a speed of the scrolling content by selecting the same location 186 again and swiping upward or by selecting another location 190 on the touchscreen within a short time period (e.g., while the content is still scrolling). The user can also decide to switch scrolling directions and can select location 192 and swipe downward to change the scrolling direction and/or scroll speed of the content items. Device 102 can scroll content items accordingly while determining whether to engage (or disengage) particular pause locations based on the inputs received and the elapsed time between receiving one or more inputs at the touchscreen.

Content items can include one or more boundaries that delineate content items from other content items. For example, content placed in a vertical scroll feed can include top and/or bottom boundaries indicating respective begin content/end content boundary lines. Similarly, content placed in a horizontal scroll feed can include side boundaries indicating respective begin content/end content demarcations from left and right boundary lines. As described herein, the boundary lines may be referred to as display anchors. Display anchors may be visible or invisible in the graphical user interfaces showing content streams.

In some implementations, display anchors can be used as a metric in which to select content items for display. For example, content items can include one or more display anchors in which software running on an electronic device can use to place content within a display screen. Display anchors may represent at least one position for each content item to denote a beginning and/or ending of content in the content item.

In some implementations, content items can be defined by more than a top and/or bottom anchor. For example, content items can be associated with a frame in which content may be presented. The frame may define a perimeter around the particular content item. The perimeter may include a top side, a right side, a bottom side, and a left side. In some implementations, three dimensional content items can additionally include a front and a back dimension to the frame. The size of the frame can vary based on the amount of content depicted in the content item. For example, text content may be displayed in a smaller frame than image content. In some implementations, more text content items than image content items may be depicted in a device screen area at one given time. In some examples, one content item covers an enter screen area (or volume).

Content items can be displayed in a timeline or content feed in any combination. In one example, a number of tweets may include (or be preceded or followed by) any number of photos, comments, videos, messages, or other content or content items. Each tweet may represent a content item (e.g., a message) posted on a social media platform (or website, application, or content host). Each content item may include a frame that can be used as a basis for displaying the content. The frame may also be used as a location associated with the content in which to snap and pause content items into a viewing location within the display screen of an electronic device. Namely, a portion of the frame may be used as a pause location in which to temporarily stop scrolling content in the display screen.

As shown in FIG. 1A, content item 182 includes a display anchor 194 and content item 184 includes a display anchor 196. Content item 180 does not show a display anchor because the top of the content is out of view of the display of device 102. Although content items 180, 182 and 184 are configured with display anchors denoting the beginning of content, additional display anchors denoting other locations within the content can be configured for use by device 102.

In some implementations, a display anchor can be used by the systems and methods described herein to select a temporary pause location for a particular content stream. The temporary pause may be shown to the user as a display effect that snaps a content item to a location in the touchscreen based on the display anchor and the scroll speed associated with the user input.

In some implementations, the display anchor 196 may define a beginning portion for a content item 182 in the stream of content items in which to pause to allow the user to view the content from the beginning. In this example, the beginning portion (indicated by display anchor 196) can be aligned with the top edge of the touchscreen display to provide easy access to the beginning of content when scrolling. This is in contrast to scrolling actions that can leave a user in the middle of a content item and having to manually scroll back to the top of a content item to begin reading or viewing the content, for example. The content can continue to be scrolled and the temporary pause can be un-paused, for example, if the user enters additional input.

In operation, a user can access device 102 and scroll through content items using touch input on a touchscreen display associated with device 102. The computing device 102 can detect a scroll speed associated with the input(s). In some implementations, the scroll speed may be based on an elapsed time between each point of contact and a particular distance between inputs on the touchscreen. In response to detecting that input is not being received for a predefined time period, the device 102 can determine and select, while scrolling, a display anchor, which corresponds to a content item. The selected display anchor may indicate a pause location for the content stream. If a particular display anchor is selected by device 102, then the content item (and the content) associated with that display anchor is selected for positioning at the top-most (or left-most) portion of the display area of a display associated with device 102. For example, the display anchor can be used as a location in which to pause the scrolling of content items such that the content item corresponding to the selected display anchor is displayed in its entirety on the touchscreen display of device 102.

In some implementations, the scroll speed associated with the user input can be used to select between scroll modes. For example, the computing device 102 can detect a scroll speed associated with user input. In response to detecting that the scroll speed for the input is at or below a predefined speed threshold, the device 102 can be configured to select a snap to location scroll mode. The device 102 can select the snap to location scroll mode and can select a display anchor as a pause location for the content stream. The display anchor may function as a location in which to snap content associated with the display anchor to a top or left portion of the touchscreen. The effect can slide the content item associated with the display anchor to the top or left portion of the touchscreen. The slide of the content item to the top or left may appear as a snap of the content item to a convenient reading location for the user.

In response to detecting that the scroll speed is above the predefined speed threshold, the device 102 can select a free scroll mode that allows free scrolling without snapping content. The free scroll mode can enable the user to quickly scroll through content items without snapping content or relocating content on the touchscreen. The free scroll mode can disengage if, for example, the scroll speed reaches and/or drops below the predefined speed threshold.

Although a top and left alignment for content may be convenient for reading English, other alignments of content within the display may be selected. For example, the device 102 can be configured to select an alignment conducive to reading different languages and such alignment can be selected based on the language of the content. Other alignments can be selected based on the type of content. For example, if particular content is image only content, an alignment may be selected to center each image if the pause/scroll animation aspect described herein is engaged.

Figure 1B:
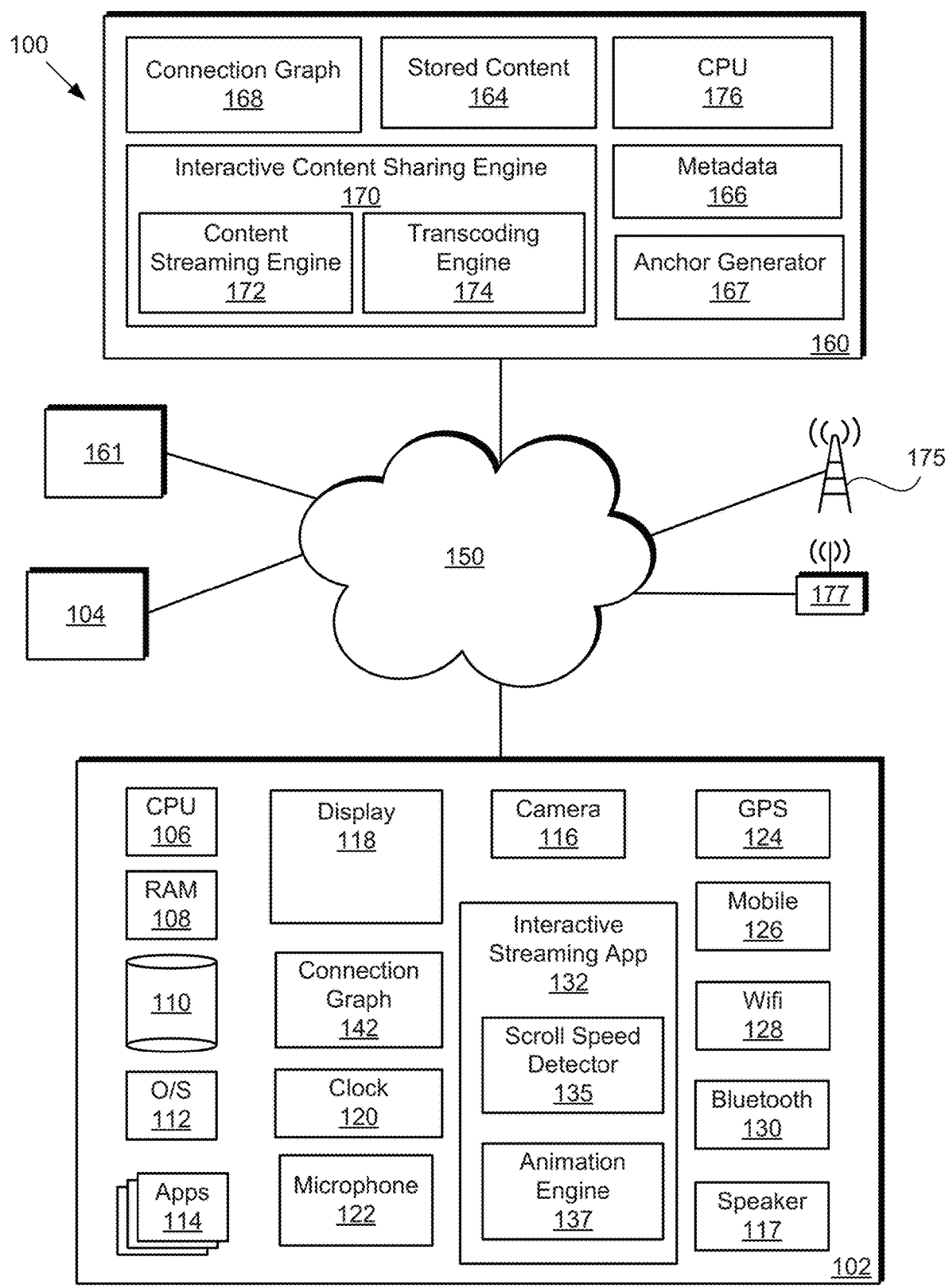

Referring to FIG. 1B a block diagram is shown of an example system 100 that can be used for accessing, scrolling, and positioning content items in a content stream. System 100 can additionally be used for uploading, broadcasting, and maintaining content items. System 100 can include one or more device(s) 102, 104 connected to one or more server computers 160, 161 through one or more networks 150. The client devices 102 may be consumer computing devices and can include a mobile computing device (e.g., a smart phone, a PDA, a tablet, a wearable device, or a laptop computer) or a non-mobile personal computing device (e.g., a desktop computing device, Internet-enabled television or entertainment system).

The computing device 102 can include one or more processors 106 (e.g., a processor formed in a substrate, such as a central processing unit, a graphics processor, etc.), a volatile memory 108, and nonvolatile memory 110. In various implementations, the volatile memory 108 may store instructions that are executed by the processor(s) 106, and the nonvolatile memory 110 may store various user data, instructions for executing an operating system, applications, etc. While FIGS. 1A/1B illustrates computing device 102 in more detail than computing device(s) 104, it is understood that computing device(s) 104 may include similar components.

The computing device 102 can include an operating system 112 and a plurality of applications 114, which can be executed by the computing device 102 (e.g., by the processor 106 executing one or more instructions stored in memory 108 or 110 that correspond to the application) and which may communicate with the operating system (e.g., through one or more application programming interfaces (APIs)). Execution of the applications 114 can provide various functionalities to a user of the computing device 102. In some examples, an email application may provide access to the user's email account and email messages associated with the account. A browser application may provide a web browser to a user, so that the user may access content that can be loaded into, and displayed by, the browser application. A social network application can provide content to the user from contacts and sources that the user has chosen to be associated with within the social media platform associated with the social network application. A camera application can provide access to use of a camera 116 within the computing device 102 for capturing still pictures or video. Applications that provide a rich variety of other functionalities and information to the user also can be provided. In some implementations, an interactive streaming application 132 may be considered one of the applications 114.

The computing device 102 includes a display 118 (e.g., a touchscreen display, an LED display, etc.) that can display a user interface for an application 114 that is being executed by the device. More than one application can be executed at a time. However, in some implementations (e.g., in the case of a smart phone), the size of the display is better suited for a single executing application to be displayed at a time. The executing application that is displayed on the display 118 can be referred to as a "front-facing" application.

The computing device 102 can include internal speakers 117 that can provide an audio output from the device. The computing device 102 also can include any number of ports (not shown) that can be used to connect the computing device to external devices, e.g., speakers that may provide an audio output when connected to the device 102. The computing device 102 may also include a microphone 122 that detects sound in the environment of the device.

The computing device also includes a clock 120 that determines a time and date and may include a GPS transceiver 124 that communicates with a global positioning system to determine a location of the computing device 102. The computing device 102 also includes various network interface circuitry, such as for example, a mobile network interface 126 through which the computing device can communicate with a cellular network 175, a Wi-Fi network interface 128 with which the computing device can communicate with a Wi-Fi base station 177, a Bluetooth network interface 130 with which the computing device can communicate with other Bluetooth devices, and/or an Ethernet connection or other wired connection that enables the computing device 102 to access network 150. The computing device 102 may include other sensors (not shown), such as, for example, an ambient light sensor, a temperature sensor, an accelerometer, etc.

An interactive streaming application 132 may be configured to enable a user of the computing device 102 to access and share interactive content via one or more social media platforms. The interactive streaming application 132 may be a mobile application, or may be a web-based application. The interactive streaming application 132 may be configured to enable the user to select a privacy setting for the accessing and/or streaming content. The privacy setting controls the potential audience for content that the user accesses or streams (e.g., broadcasts).

The connection graph 142 may be a subset of the connection graph 168 that resides on server 160. A connection graph is a data structure representing relationships (i.e., connections) between one or more entities. For example, the connection graph 168 may be a data set that stores relationships between social media accounts. Relationships may include friending, following, linking, or some other relationship. An entity is directly connected to another entity in the connection graph when the two entities are connected by a path length of one.

After receiving a request from the user who wants to upload content, the interactive streaming application 132 may be configured to use various components of the computing device 102 to capture and send content and to display interactions (e.g., engagement representations) from viewers of the content. For example, the interactive streaming application 132 may use the camera 116, the GPS 124, and the microphone 122 of the computing device 102 to capture content with video and/or audio. The interactive streaming application 132 may also be configured to use one of the computing components (e.g., network interface 128, mobile network interface 126, etc.) to provide the content to a server, such as servers 160, 161. The metadata may include information such as how many viewers have joined the content and are currently viewing content.

The interactive streaming application 132 may be configured to provide streaming content or static content from a computing device 102 to a server, such as servers 160, 161. The server 160 may be a single computing device, or may be a representation of two or more distributed computing devices communicatively connected to share workload and resources. In some implementations, the server 160 is a social media platform server. The server 160 may also include one or more processors 176 formed in a substrate configured to execute instructions. The instructions may be stored in memory, such as RAM, flash, cache, disk, tape, etc. In addition, the server 160 may include one or more data stores configured to store data in a persisting manner. For example, the server 160 may store a connection graph 168. In some implementations, the connection graph 168 may represent entities that have installed an interactive streaming application 132 and set up a user account through the interactive streaming application.

In some implementations, the connection graph 168 may represent entities from more than one social media platform or entities that have installed various social media applications. Thus, the connection graph 168 may be understood to represent multiple distinct data sources, each representing a separate set of entities and relationships for separate social media platforms. In some implementations, a first user account in one data store may include an identifier for a second user account in a second data store, where the first user account and the second user account correspond to a single human user. Thus, the interactive content sharing engine 170 may be able to access the second data store via the link between the first user account and the second user account. The system may thus access a second social media platform via such connected accounts. The human user may have control over such connections.

The server 160 may also include an anchor generator 167. The anchor generator 167 may generate display anchors that represent a position for each content item and that denote a beginning or end of content in the content item, where the beginning and the end of a content item refers to the start/end of the display of the item in the display 118. For example, the beginning and/or end of a content item can be the highest and/or lowest position of the content item in a rectangular display or can be the left-most and/or right-most position of the content item in a rectangular display. Since content items can include content that varies in length, the display anchors can be used as a metric in which to select content items for display. Display anchors may be visible or invisible in the graphical user interfaces described herein.

In one non-limiting example, the anchor generator 167 can generate an anchor for either the beginning of a content item or for the end of a content item. For example, the anchor generator 167 can generate an anchor to enable stopping at the beginning of a content item in response to a scroll input and thus, can trigger pausing/stopping content scrolling on the beginning anchor. Alternatively, the anchor generator 167 can generate an anchor at the end of a particular content item, if for example, the content item is the last item in a list or timeline. In such an example, the content item will be snapped at the end of a scrollable area instead of at the beginning of the scrollable area.

In some implementations, the streaming application 132 can detect a beginning of a scroll event. In response to detecting the beginning of the scroll event, the application 132 can identify the current anchor. Identifying the anchor can include finding a first available (e.g., visible) content item. Upon finding the first available content item, the application 132 can determine whether the content item is less than 50 percent visible (e.g., a visible height is less than half the actual height of the content item). If less than 50 percent of the content is visible in the screen, then the anchor to pause on is a prior anchor and the next content item after the partially visible content item is selected as the current anchor in which to pause content. In operation, a slow or short swipe input on a content item that is less than 50 percent visible may cause the content to scroll upward to snap two content items after the first visible item.

In another example, if the first available content item depicts less than 25 percent of content (e.g., less than 25 percent of the scrollable area height), then the anchor associated with the first visible content item is selected as the pause/snap to location anchor. Accordingly, the first visible item is not skipped, but is instead displayed. In operation, scrolling upward can invoke the anchor to snap to the first visible content item in the screen.

The server 160 may also store metadata 166. Metadata 166 may store data, e.g., information and statistics, for real-time content broadcasts. The data may include a total quantity of viewers, how long each viewer watched content, etc. The server may also store content 164 for a limited time.

The server 160 may also include an interactive content sharing engine 170. The interactive content sharing engine 170 may service a social media platform, and thus, may have access to the connection graph 168 for the social media platform. The content sharing engine 170 may include a content streaming engine 172 and a transcoding engine 174. The transcoding engine 174 may be configured to receive the content from a broadcasting consumer device (e.g., a smartphone or a wearable computing device) and to convert it into a variety of different formats for playback on client viewing devices. The content streaming engine 172 may be configured to provide the transcoded content stream, including engagement indications, in a format appropriate for a particular client viewing device. Thus, the transcoding engine 174 may convert the content from the broadcaster into a plurality of formats and, when a viewing device joins a particular content feed or stream, the content streaming engine 172 may select, based on information about the viewing device, an appropriate format for the viewing device. In some implementations, content items (e.g., in a content feed) may be formatted for a mobile device screen for a mobile application or mobile-based browser application. In other implementations, content items (e.g., in a content feed) may be formatted for a laptop or desktop device such that the content items can be displayed in a web browser.

The interactive streaming application 132 may be configured to display messages regarding content and/or content streams. Content can be provided in a static or dynamic fashion. The interactive streaming application 132 may also be configured to enable the user to provide engagements while viewing content. For example, when a user provides a gesture, such as a tap on a touch screen display 118 to engage with and/or scroll content. In another example, the user may use an input device, such as a mouse, to click in the display 118, while watching the content, the interactive streaming application 132 may interpret the tap or click as a scroll indicator.

The interactive streaming application 132 may also enable a viewer to enter comments, which are provided to the interactive video sharing engine 172 at server 160. The interactive video sharing engine 172 may provide information about this engagement, such as the initials or username of the viewer providing the comment, as well as the content of the comment, to viewing devices. In addition to comments, the interactive streaming application 132 may enable a viewer to invite others to view the content stream. For example, anyone connected to the viewer via the connection graph 168 or 142 may receive a message with an invitation to join the content stream.

Viewing and interacting with content on computing device 102 can include a user accessing a screen of device 102 using tactile or gesture-based interaction queues. The screen of device 102 may be a touchscreen. The touchscreen can be accessed by a user using fingertips, palm, stylus, or other input mechanism capable of interfacing with the touchscreen, to select and/or scroll content items. In one non-limiting example, the user can select and drag (e.g., swipe) a fingertip on the screen to begin scrolling content items. When the user swipes, a succession of content items move into and out of view as scrolling occurs. The user can swipe any number of times on the touchscreen and each swipe can be associated with a force that can be detected by device 102. The detected force can be used to configure a direction and a speed at which content items scroll through a viewable portion of the touchscreen. For example, device 102 can include a scroll speed detector 135 to detect input gestures performed by the user accessing scrollable content on the device 102. In particular, the scroll speed detector 135 can detect each point of contact received and a corresponding point of direction in which to scroll the content items. The point of contact may refer to a centroid location of a fingertip input provided on the touchscreen. In addition, the scroll speed detector 135 can detect a time in which an input is received on device 102.

When the user selects a point of contact and swipes in a direction on the touchscreen, the speed of the swipe can control the speed at which the display controls the scrolling speed of the content items. The scroll speed detector 135 can determine the speed of the swipe by detecting a time at which the fingertip contacts different portions of the touchscreen. In some implementations, detecting the scroll speed associated with the input(s) can include measuring or calculating an elapsed time between each point of contact (on the touchscreen) performed by the user.

Once a scroll speed is determined, the computing device 102 can detect that the user has stopped scrolling (e.g., when the user is no longer swiping). During this detection, a number of content items may be skipped or scrolled past before the scrolling display comes to rest. In some implementations, the detection that the user has stopped scrolling can occur after one swipe. In some implementations, the detection that the user has stopped scrolling can occur after any number of swipes. In some implementations, the speed of the scrolling can gradually slow down from a maximum scroll speed to zero, to give the user the impression that the display has a momentum that is arrested according to a mathematically applied frictional force that can be algorithmically applied upon detecting that the user is not swiping.

In some implementations, the scroll speed can be used to determine how many display anchors (signifying a beginning of content) to skip within the stream of content items before pausing the scrolling. In response to detecting that the scroll speed for a particular sequence of inputs is at or below a predefined speed threshold, the device 102 can be configured to select, while scrolling, a display anchor as a pause location for the content stream.

In one non-limiting example, a user may be moving through a stream of content items slowly so that the user can follow each item in the stream as it scrolls by. If the user wishes to scroll at a faster pace, the scroll speed detector 135 can provide the advantage of engaging display effects that snap individual content items into a location on the mobile device 102, for example, such that the user can view the beginning of the content as the user scrolls through content at a predefined scroll speed threshold.

In some implementations, the scroll speed detector 135 may be preconfigured with at least two constant values that define a range at which a snap to location (e.g., engage snap display effects/content pauses) should be triggered. The values may be defined in pixels per millisecond. In general, the lower the value of the scroll input velocity, the more difficult it may be to free scroll with a small or short scroll input (e.g., swipe). The constant values can be preconfigured for particular content feeds. A value of zero may indicate that the content is configured to show snap display effects, in response to scroll input. A value of about 50 pixels per millisecond (or higher) can ensure that snap display effects are not used.

An example minimum velocity for triggering a pause using snap display effects may be about 1.2 to about 1.6 pixels per millisecond to engage snap display effects. Such a range may ensure that snapping occurs most of the time. A user may enter a slow swiping motion to instead free scroll through content and avoid snap display effects. An example maximum velocity for triggering a pause using snap display effects may be from about 5.8 to about 6.2 pixels per millisecond. Such a velocity may engage snap display effects with a moderately strong flicking scroll input.

Example velocity settings of about 9.5 to about 10.5 pixels per millisecond may enable free scroll after a strong flicking scroll input or after multiple consecutive flicking scroll inputs. Example velocity settings of about 14 to about 16 may disable free scroll after one flick and may remain as such until, for example, the system receives at least two strong consecutive flicking scroll inputs.

In some implementations, the predefined speed threshold may define a display time for a content item on the display screen. The display time may represent an amount of time a particular content item is displayed in the display device before being scrolled off of the screen. Example display times may include about 20 to about 60 milliseconds In some implementations, the predefined speed threshold may be a determined value approximated by calculating an average scroll speed for any number of users interacting with an application presenting a stream of content items. In some implementations, the predefined speed threshold may be determined using a device manufacturer threshold for scrolling. In some implementations, the predefined speed threshold may be determined by the operating system running on the device.

In some implementations, the decision to select a particular display anchor at which to stop the scrolling can be based on an area of screen real estate a particular content item covers. For example, the systems described herein may select a content item that is closest to the point at which the content stream begins to slow and stop in response to the swipe input.

The animation engine 137 can lock content items into a view to ensure that the user is provided a view of content depicting a beginning of the content item at a top or left side of a display. This may ensure the content is ready for viewing from beginning to end in a comfortable fashion for the user. The lock of the content may be temporary and can be provided as an animation that appears to magnetically snap the beginning of a content item into place within a display of a computing device. The lock or snap location may be based on user input including, but not limited to scroll speed, swipe speed, touch-screen display contact location, a direction of movement associated with a scroll gesture or input, and/or a release speed associated with a scroll gesture or input.

The animation engine 137 can perform scroll animations that move content items into position. The scroll animation may include a slide, a fade, a bump, a shake, a cut transition, a sinking, a raising, or other animation to move the content item into a top or left most reading position on a display of a mobile computing device.

Figure 2A:
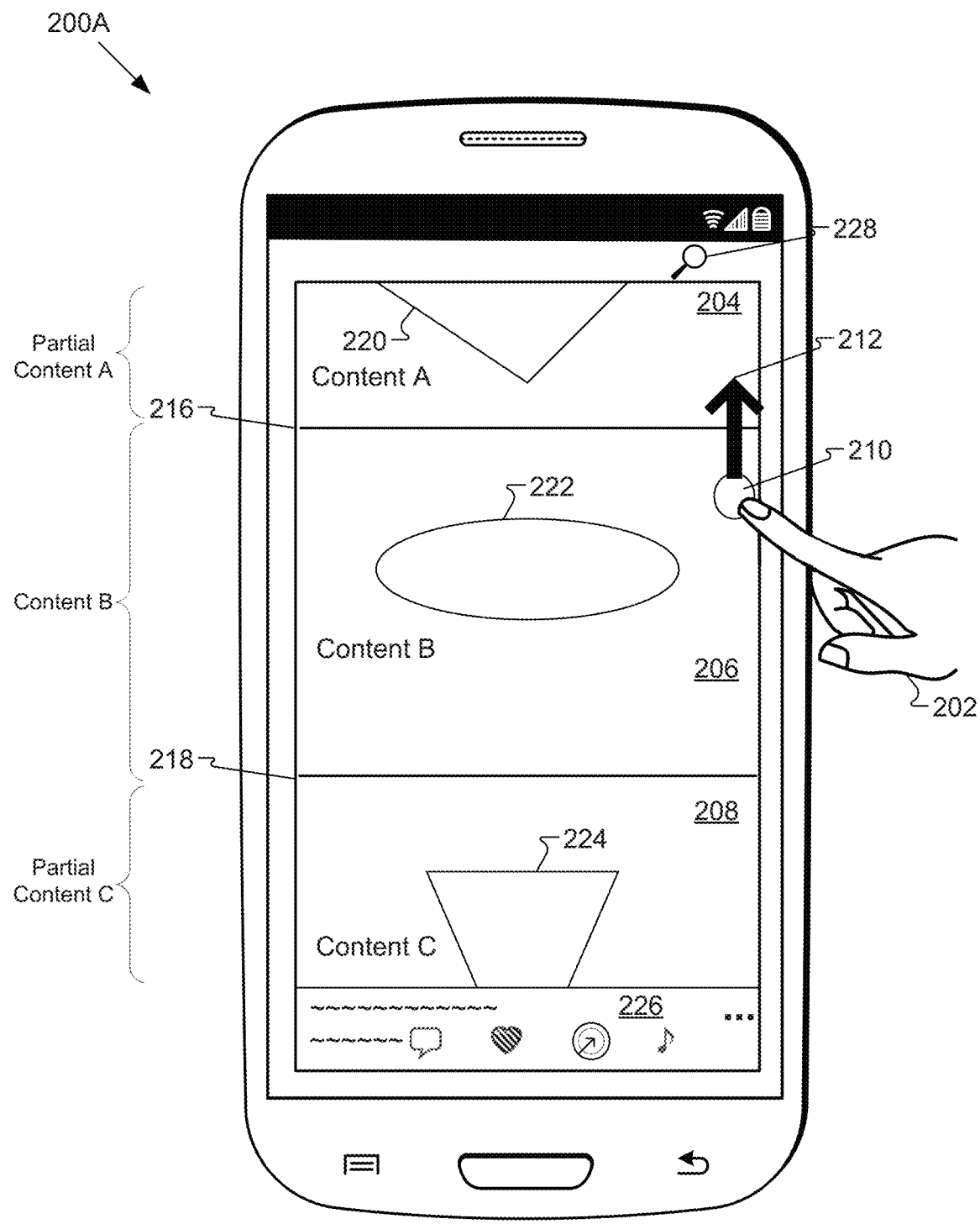
FIGS. 2A-2B are schematic diagrams illustrating an example graphical user interface enabling users to scroll content feeds.
Figure 2B:
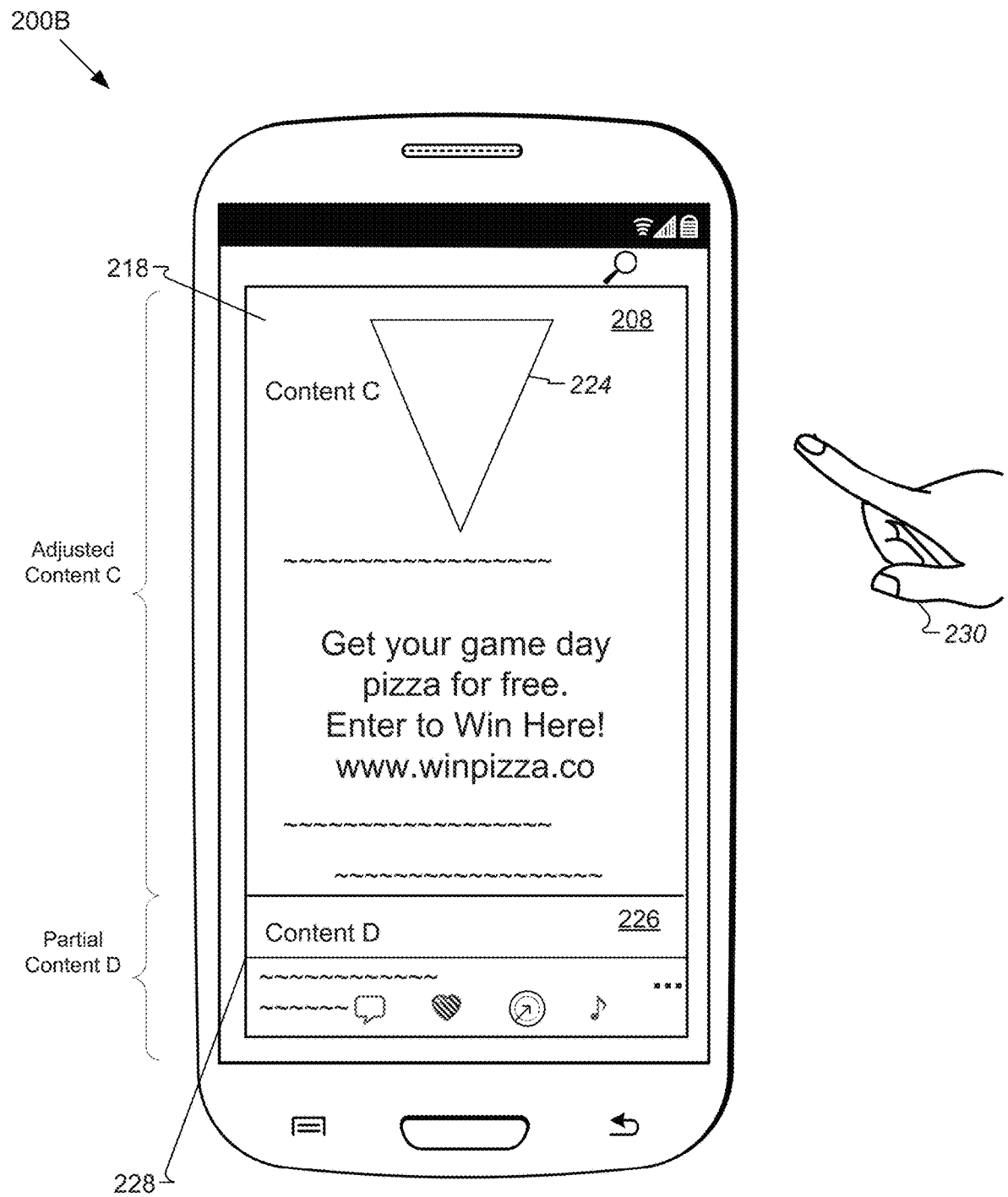

FIGS. 2A-2B are example schematic diagrams illustrating a graphical user interface (GUI) 200A enabling users to scroll content feeds, according to an implementation. In the following examples, the content is shown in a content feed. In general, a content feed can include text, images, video, application content, timelines, social network content, symbols, messages, numbers, and/or online content and the like. Other mechanisms other than a content feed can depict content that is scrollable and usable with the systems and methods described herein.

The graphical user interfaces of FIGS. 2A-2B may be generated by a streaming application, such as interactive streaming application 132 of system 100 of FIGS. 1A/1B. In some implementations, the interface 200A-200B (as well as interfaces 300A-300D) may be executing a messaging platform application and the messaging platform application may present the stream of content items. In one example, the content items can be streamed in a timeline in a chronological (or reverse-chronological) order according to when the content is uploaded, broadcast, or made available. In other implementations, the timeline may be provided with content that appears in an order according to various algorithms (e.g., popularity of the content). In one example, a reverse-chronological stream may portray content in an ordered fashion, from top to bottom or left to right, and from the most recent post to the least recent post. While the computing device illustrated in FIGS. 2A-2B is a consumer mobile computing device, should be understood that the depicted graphical user interfaces may be generated for another type of consumer computing device, such as a wearable device, a tablet, a desktop, or a laptop computer running a browser.

As shown in FIG. 2A, the graphical user interface 200A includes content that a user 202 is actively scrolling in an upward and vertical direction. The user may instead scroll in a downward direction as well as a side-to-side horizontal direction. Upon receiving at least one scroll input, the device (e.g., device 102) may begin scrolling content in the touchscreen display of device 200A.

In the depicted example interface 200A, content is shown in a content stream. The content stream may include any number of scrollable content items in which the user can view on the touchscreen upon scrolling. As shown, the content items in the viewable area of the touchscreen include a content item 204 that includes Content A, a content item 206 that includes Content B, and a content item 208 that includes Content C. The content items 204, 206, and 208 are displayed in the viewable touchscreen and selectable by the user. Additional content may be provided in the stream before and after content items 204, 206, and 208.

In this example, the user 202 is scrolling by selecting the touchscreen and moving upward (e.g., swiping at point 210) to scroll the stream of content items in the direction of arrow 212. The user may swipe the touchscreen one or more times to scroll content. When the user swipes, a succession of content items move into and out of view as scrolling occurs. For example, the user may swipe once to scroll through content items to invoke a particular scroll speed until the user ceases to provide input causing the scroll to slow and come to rest. The user can swipe multiple times consecutively (e.g., two or more times) to increase the scroll speed, which increases the movement of content items across the display of device 102.

As shown in interface 200A, content item 204 includes Content A, in part, at the top of the display of device 102. Content item 206 includes a display anchor 216 and content item 208 includes a display anchor 218. Content item 204 does not show a display anchor because the top of the content is out of view of the display of device 102. In general, a display anchor can be used by the systems and methods described herein as an element in which to trigger a pause location for a particular content stream. For example, the display anchor 218 may define a beginning portion for a content item 208 in the stream of content items. The beginning portion can be aligned with the top edge of the touchscreen display to provide easy access to the beginning of content when scrolling. This is in contrast to typical scrolling actions that can leave a user in the middle of a content item and having to manually scroll back to the top of a content item to begin reading or viewing the content, for example. In some implementations, the display anchor may indicate an end of content in a content item, rather than the beginning of content in the content item. Accordingly, the display anchor (not shown) at the end of the content item may be used as a pause location.

In the example interface 200A, the content items 204, 206, and 208 are not well aligned for the user to begin comfortably viewing the first content item in the display of the touchscreen. For example, Content A includes a partial shape 220 that indicates that additional content relating to partial shape 220 is available, if the user were to scroll upward. By contrast, all of Content B is included and shown by shape 222. As for Content C, a partial shape 224 is shown indicating that additional content is available if the user were to scroll downward.

The user can interact with content within the touchscreen using any or all of controls 226. For example, the user 202 can chat, comment, upload, download, mute, unmute, and otherwise interact with content using controls 226 or by directly selecting content in the stream. In some implementations, the user interface 200A may include a search control 228 that initiates a query entered by the user in text input to search for particular users, content, and/or locations. When the user 202 enters a query and submits the query via control 228, the computing device 102 may provide the query to the server and/or the server 160 may provide a list of matching content. The content may match based on words or topics in the title, in the comments, in the location name, or in user name or relationship to another user.

In operation, the user 202 can scroll content by selecting one or more times on the touchscreen, as shown at touch 210. The user can continue to perform scroll motions while scrolling and surfacing content in the content stream. The computing device 102, for example, can detect the scroll motions (e.g., inputs, scroll gestures) by detecting one or more points of contact and at least one time at which the input is made in the touchscreen. In addition, the computing device 102 (e.g., via scroll speed detector 135) can detect a scroll speed associated with the input(s). In some implementations, the scroll speed may be based on an elapsed time between each point of contact. The elapsed time can be calculated using the at least one time metric detected for each input. In some implementations, the scroll speed may be based on a detected distance between two or more inputs and an elapsed time between the inputs.

In response to determining a lack of input for at least a predefined time period, the device 102 can be configured to select, while scrolling, a display anchor, corresponding to a content item, as a pause location for the content stream. The display anchor may function as the pause location for a particular content item. Thus, if a particular display anchor is selected by device 102, then the content item (and the content) associated with that display anchor is selected for positioning at the top-most portion of the display area of a display associated with device 102. The predefined time period can be system defined, user defined, or automatically configured according to user behavior. Example predefined time periods may include about 500 milliseconds to about 3 milliseconds, 100 milliseconds to about 1 second, or 400 milliseconds to about 5 seconds.

If a display anchor is selected and no additional input is detected for the predefined amount of time, the device 102 can pause the scrolling of the stream of content items at the pause location such that the content item corresponding to the selected display anchor is displayed in its entirety on the touchscreen display. In some implementations, the content item corresponding to the selected display anchor is displayed in part with the beginning portion of the content being aligned with a top and left portion of the touchscreen of device 102, for example.

As shown in FIG. 2B, one or more inputs 210, times of inputs (not shown), and directions of scroll (e.g., direction 212 from FIG. 2A) have been received in the user interface 200B. It has been determined that user input has ceased for the predefined time period. In operation, the user 202 (FIG. 2A) lifted her hand 230 from the touchscreen and the pause location engaged to stop scrolling content. Accordingly, the device 102 paused the scrolling at the selected display anchor 218 (e.g., content pause location). Here, the display anchor 218 is associated with content item 208. As shown in user interface 200B, the shape 224 is now shown in full and the beginning of the content 208 is aligned at the top of the display area. In operation, device 102 may invoke the pause, which may present, in the display, the content item 208 associated with the selected display anchor 218 since the user was scrolling upward and stopped as a majority of content item 208 was in the display area.

The device 102 can select a display anchor based on any number of variables and begin to adjust the display to pause scrolling while simultaneously placing a selected content item (e.g., content 224) with a beginning content portion of the content item 208 being placed in a top viewable portion of the display. In the depicted example of FIG. 2B, the content includes an advertisement for free pizza and the content is conveniently placed to enable a user to read the advertisement from the beginning of the content 224. The entire ad is not fully displayed in the touchscreen, but the user 230 can conveniently begin reading the content and then scroll to review the additional portions of the same content item 208. A content item 228 is shown in part indicating that additional content can be scrolled. In some implementations, the entire content item 208 may be shown in the touchscreen when the pause animation engaged.

The pause of the scrolling and subsequent positioning of the content item will cease upon detecting an additional input. For example, in response to detecting an additional input, the scrolling may continue in a direction associated with the additional input. For example, if the user 230 begins to execute input again (e.g., input scroll gestures on the touch screen), the device 102 can detect any and all of the additional inputs. The device 102 can again calculate a scroll speed for the additional inputs, for example, by determining a time period (e.g., elapsed time) between two or more of the additional inputs.

In some implementations, the scroll speed can be adjusted to the calculated scroll speed and if no further inputs are received over a predefined time period (e.g., a few seconds or milliseconds), the device 102 can adjust the scroll speed to the calculated scroll speed to scroll at a progressively slower speed. Engaging the pause animation by selecting a display anchor can pause the scroll to display at least one content item arranged for display in alignment with a top-most viewable area of the display of the device 102, for example.

Upon receiving additional input, device 102 can be configured to determine and select an updated display anchor each successive time an input is detected. The updated selection of the display anchor may be based on the scroll speed and a location of one or more concurrent display anchors. The display anchors may be associated with respective content items provided in a viewable area of the display of device 102, for example.

In some implementations, device 102 may detect that a scroll speed associated with user input is above the predefined speed threshold. Such a detection can trigger a free scrolling mechanism in which the pausing and readjusting of content items, as described herein, is not performed. Thus, the device 102 can disengage automatic pause animations until detecting that the scroll speed reaches a predefined speed threshold, or until no input is detected for a predefined time period.

FIGS. 3A-3D are schematic diagrams illustrating a graphical user interface (GUI) 300A enabling users to scroll content, according to an implementation. The graphical user interfaces of FIGS. 3A-3D may be generated by an interactive streaming application, such as interactive streaming application 132 of system 100 of FIGS. 1A/1B. While the computing device illustrated in FIGS. 3A-3D is a consumer mobile computing device, it should be understood that the graphical user interface may be generated for another type of consumer computing device, such as a wearable device, a tablet, a desktop, or a laptop computer running a browser.

Figure 3A:
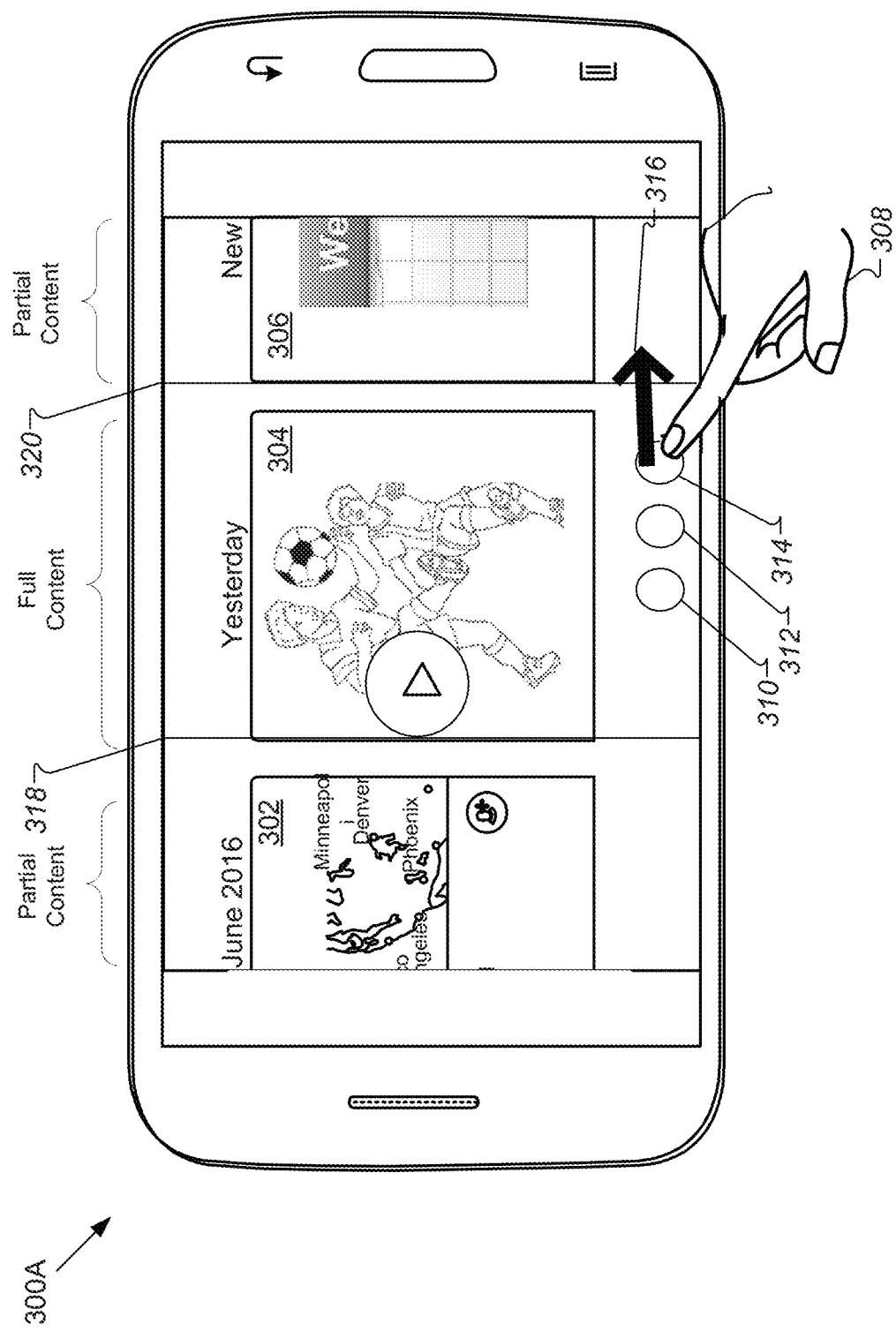

As shown in FIG. 3A, content items include interactive posts that are shown in a horizontal stream on a user interface 300A. The interactive posts include "June 2016" content 302, "Yesterday" content 304, and "New" content 306. Each interactive post is shown associated with a time of upload or access. For example, interactive post 302 is a map that was uploaded or accessed in June of 2016 while interactive post 304 is a video that was updated or accessed yesterday. Similarly, interactive post 306 was accessed most recently. Each interactive post may be associated with a display anchor that defines a content begin area for the interactive post. Here, the display anchor for post 302 is off the screen, but the display anchors 318 and 320 are shown, respectively, for post 304 and post 306.

The user 308 is shown beginning to scroll by selecting one or more scroll areas 310, 312, and 314. The selections may be successive with 500 milliseconds or more in between selections. Each scroll input may include a contact location, a time of input, a direction (e.g., arrow 316), and a release speed. The time of input may pertain to a time at which the user engages the touch screen. The release speed may pertain to a speed at which the user removes a touch input from the touchscreen display. As shown in interface 300A, the user 308 has provided scroll input using a number of scroll gestures (indicated by contacts 310, 312, and 314) with multiple single finger selections (e.g., contacts 310, 312, and 314) on the touchscreen display of device 102, for example.

In response to the user 308 performing the gestures (e.g., indicated by contacts 310, 312, 314), device 102 may detect the gestures and begin scrolling through the interactive posts available. Once receiving additional gestures, each having respective detected contact locations, directions, and release speeds, the device 102 can determine whether one or more of the release speeds is at, or below, a predefined threshold speed for scrolling.

Figure 3B:
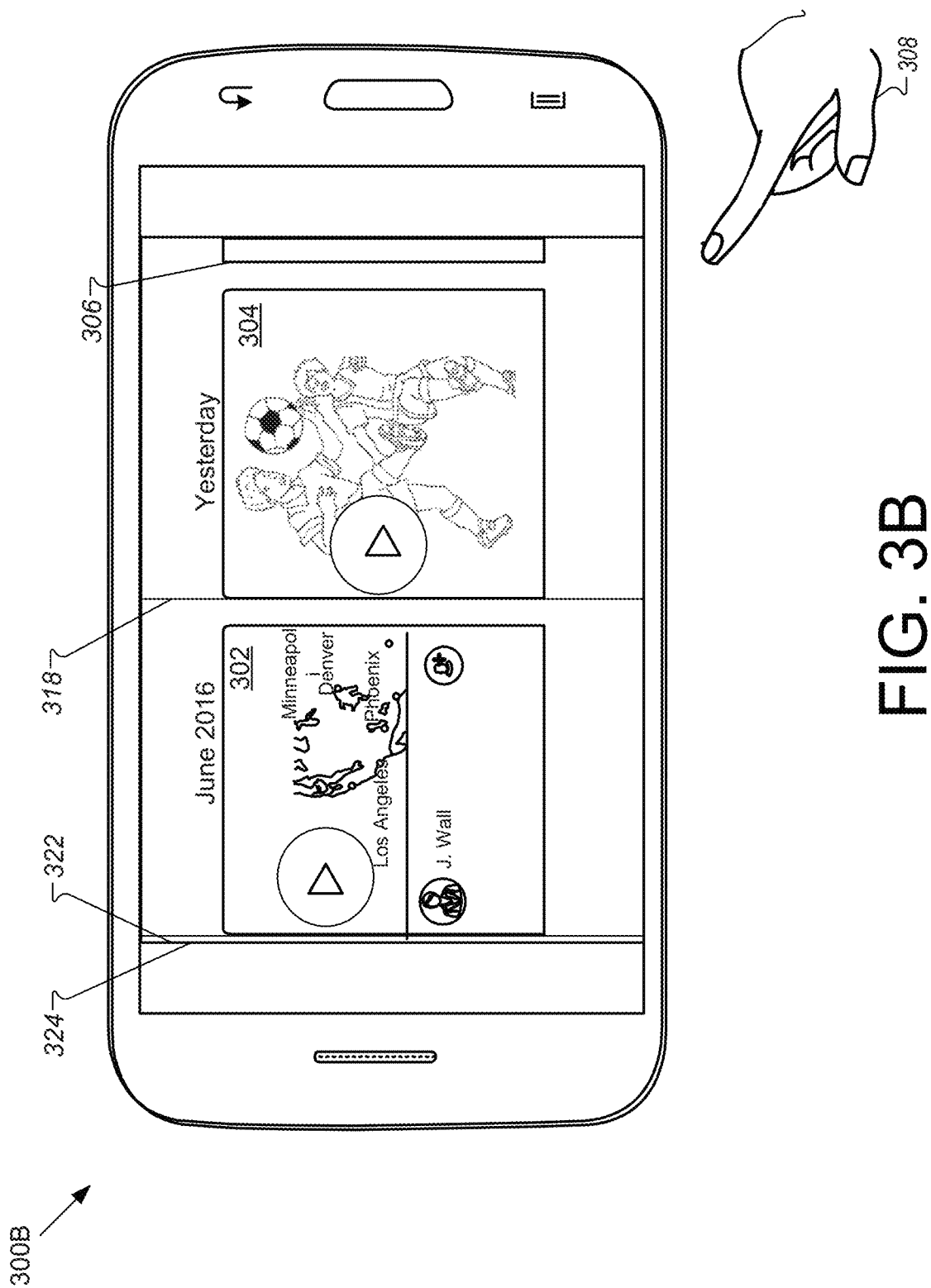

As shown in FIG. 3B, the user interface 300B shows an updated view of interface 300A in which at least one of the release speeds associated with user 308 input in interface 300A was determined to be at or below the predefined threshold speed. In this example, the device 102 engages a scroll animation for the interactive posts to scroll the interactive posts according to the scroll animation. For example, user 308 removed her input, device 102 detected a release speed below, or at, the predefined threshold speed and began to pause the scrolling to present a selected post in a desirable fashion for the user 308. The pausing may be performed as an animation as described above. Such an animation may include selecting and arranging one interactive post in the scrolling interactive posts in the display of the mobile computing device to begin at a top or a left edge of a top-to-bottom or left-to-right display location in a viewable display area of the display of the mobile computing device. If the display is being scrolled in a horizontal fashion, the left edge is selected in a left-to-right display arrangement. If the display is being scrolled in a vertical fashion, the top edge is selected in a top-to-bottom display arrangement.

The scroll animation for the interactive posts may be configured to pause the scrolling of interactive posts by analyzing one or more times associated with received input and a distance throughout the stream corresponding to display anchors that define a content begin portion of each interactive post. The scroll animation can be provided upon determining which display anchors are within the boundary of a viewable area of the display and within those display anchors, which is closest to the top edge or left edge without already having been scrolled off the viewable area of the display. In the example in FIG. 3B, the device 102 can select such a display anchor, such as anchor 322 associated with post 302, and because the user is scrolling in a rightward fashion, anchor 322 corresponds to the next available post that has yet to be viewed and has not scrolled off of the viewable display area of device 102. The device 102 can use the scroll animation to align post 302 with the edge 324 of a viewable portion of the display of the mobile computing device such that the content begin portion is aligned with the edge 324 to provide the entirety of the post 302 in the display of the mobile computing device.

FIG. 3C illustrates an example user interface 300C with a user 330 scrolling. The user 330 is using a horizontal hand swipe to scroll through an example content feed. If the device hosting interface 300 C were vertical, the hand swipe may be performed in a vertical fashion. The hand swipe may represent a scroll gesture and each scroll gesture may include at least one contact location, a time of the contact, a direction, and a release speed. In this example, the scroll gesture includes four contact locations 332, 334, 336, and 338 and a direction associated with the contact locations (indicated by arrows 340). Additional gestures may be performed in the same fashion to repeatedly scroll content in the feed. The scroll gestures may be successive with a second or more between selections.

In the interface of 300C, the content item 302 is already aligned to show the beginning of the content, but the user 330 may wish to continue scrolling and can do so by performing one or more scroll gestures. As shown, the user 330 swipes left using one or more swipes to view additional content.

Figure 3D:
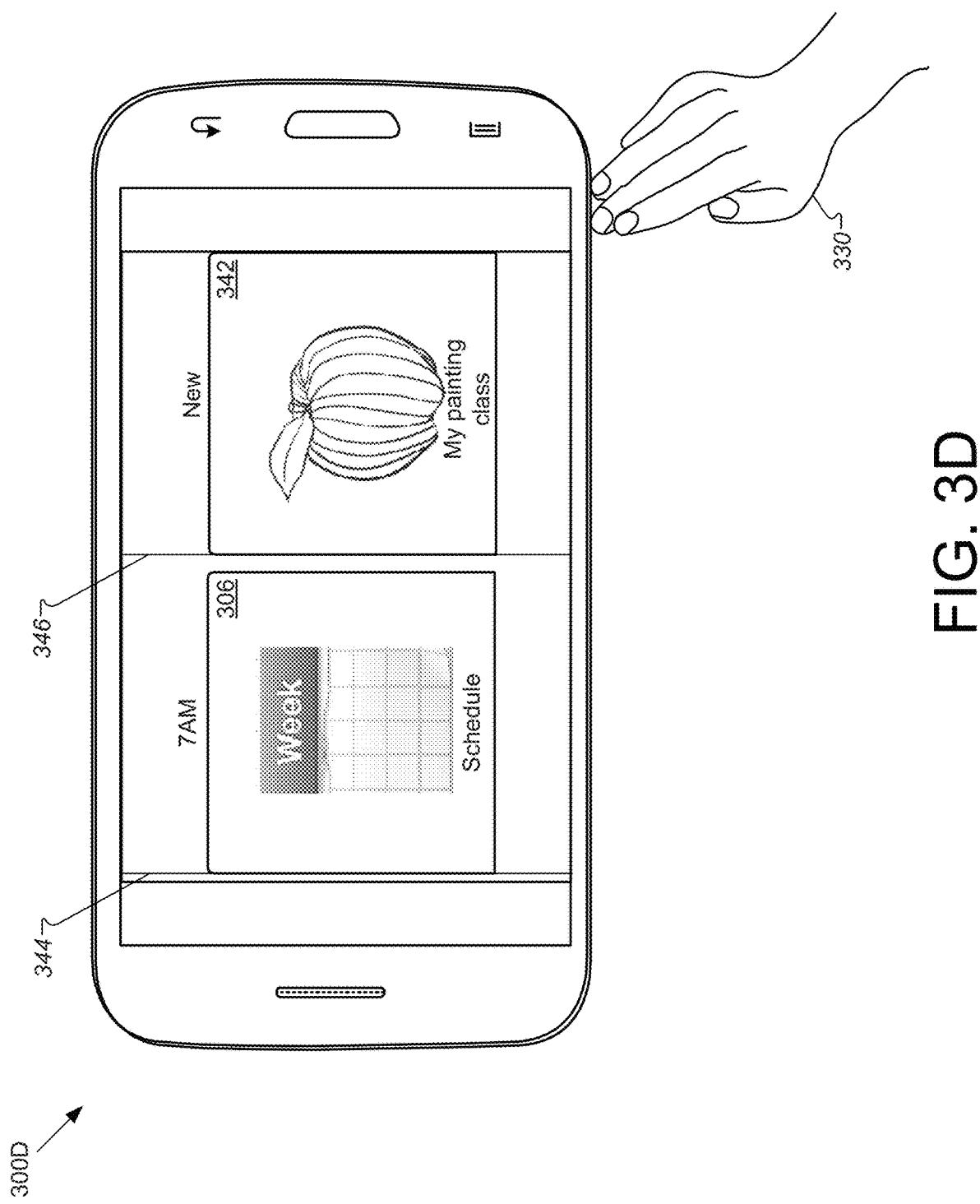

FIG. 3D illustrates an example user interface 300D with a user 330 having swiped left from the view shown in interface 300C. Here, the leftward swipe brought the user back to content item 306 in which the user can view a calendar of her schedule. The swipe also brought about new content item 342 of a painting class project. Each content item 306 and 342 includes a respective display anchor 344, 346.

The user 330 can continue to perform scroll motions while scrolling and surfacing content in the stream of content. The computing device 102, for example, can detect the scroll motions (e.g., inputs, scroll gestures) by detecting each point of contact and each time at which the point of contact is received. In addition, the computing device 102 (e.g., via scroll speed detector 135) can detect a scroll speed associated with the input(s). In some implementations, the scroll speed may be based on an elapsed time between each point of contact.

In response to detecting that input has not been received for a predefined time period, the device 102 can be configured to select, while scrolling, a display anchor as a pause location for the content stream. In the example in interface 300D, the device 102 selected display anchor 344 based on the scrolling direction, the content item 306 being partially on the screen and upcoming in the scroll, and on the scroll speed.

The selected display anchor 344 may function as the pause location for content item 306. Thus, display anchor 344 is selected by device 102 in interface 300C, then the content item 306 (and the content) associated with that display anchor is selected for positioning at the left-most portion (or top-most portion) of the display area of a display associated with device 102. Other content can be depicted after the arranged content 306. In some implementations, the positioning of content items to be aligned with a left or top edge of a display area may include depicting only one content item at a time in the stream. In other implementations, any number of content items can be displayed in the stream as long as the first item in the stream is aligned as described above when the scroll speed of the user corresponds to a speed at or below the predefined threshold speed.

In the example of interface 300D, the scroll speed was determined to be at or below the predefined threshold speed, and accordingly, the device 102 paused the scrolling at the selected display anchor 344 (e.g., content pause location). In operation, device 102 may invoke the pause, which may present, in the display, the content item 306 since the user was scrolling leftward and stopped as a majority of content item 306 was in the display area.

Figure 4:
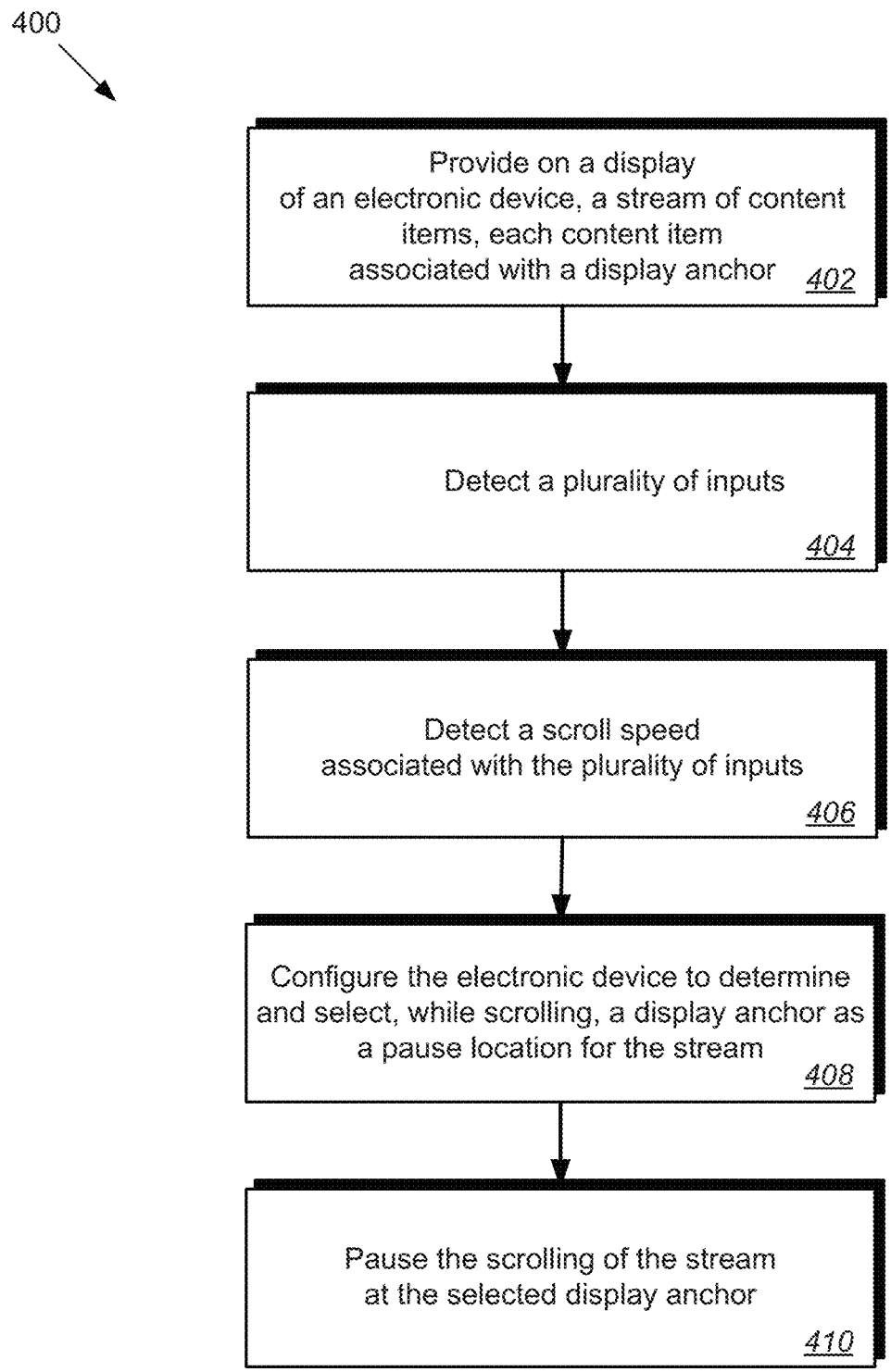
FIG. 4 is a flowchart that illustrates an example process of providing scrollable content in a display.

FIG. 4 is a flowchart that illustrates an example process 400 of providing scrollable content in a display. Process 400 may be executed by a consumer computing system, for example device 102 of FIGS. 1A/1B. Process 400 may receive scrolling input from a user and use such input to determine which particular content item, in a stream of scrolling content items, to arrange a selected content item in a convenient display area for the user.

The process 400 may include, at box 402, providing, on a display of an electronic device, a stream of content items. At least some of the content items may be associated with a corresponding display anchor. The display anchor may define a beginning portion for a content item in the stream of content items. In one example, the computing device 102 displays, in a touchscreen display, a number of content items in a scrollable list. Each content item may be separated from another content item by a visible (or invisible) display anchor.

At box 404, the process 400 may include detecting, a number of inputs to the touchscreen display. The inputs may be associated with at least one point of contact on the touchscreen and at least one time at which the input is made. In some implementations, each input is associated with a horizontal scroll gesture or a vertical scroll gesture. In some implementations, the inputs represent touch-based user input on a touchscreen display. For example, FIG. 2A (by user 202), 3A (by user 208), and 3C (by user 230) each show examples of touch input that results in scrolling content in the content streams on a touchscreen display.

At box 406, the process 400 may include determining a scroll speed associated with the inputs. The scroll speed may be based on a detected distance between a number of inputs and/or based on elapsed time between at least two inputs (e.g., an elapsed time between each point of contact). Thus, the scroll speed may be correlated to a velocity of an input motion (e.g., a swiping motion). For example, a velocity of a particular input motion can be calculated using a point of contact and a time at which the point of contact is made. In some implementations, a particular anchor can be determined based on scrolling velocity. In general, the scrolling velocity may accumulate speed each time a scroll input is received and may quickly decrease upon a user ceasing to provide scroll input.

In one example, the system 102 can detect a time between points of contact for each successive input. This elapsed time between such inputs can be used to determine how fast the user wishes to scroll content. In some implementations, the elapsed time between at least two of the inputs is a determined value corresponding to an average scroll speed for a number of users interacting with an application presenting streams of content items. For example, the elapsed time can be selected by analyzing time periods between user inputs in a messaging platform application configured to present the stream of content items.

The device 102 can determine a speed associated with the input and can engage or disengage a pause animation based on the speed and a lack of user input for the predefined time period. In some implementations, the scroll speed associated with the input may be a scroll speed that can be used to determine how many anchors to skip (e.g., scroll beyond) before pausing scrolling.

At box 408, the process 400 can configure the electronic device to determine and select, while scrolling, a display anchor corresponding to a content item, as a pause location for the stream if, for example, the device detects that input has not been received for a predefined time period. For example, device 102 can receive one or more scroll gestures as input to begin scrolling content in the content stream.

At box 410, the process 400 includes pausing the scrolling of the stream of content items at the pause location such that the content item corresponding to the selected display anchor is displayed in a top viewable portion of the display. In some implementations, pausing the scroll at the pause location may include configuring the electronic device to present, in the display, a content item (and corresponding content) associated with the selected display anchor such that the content item corresponding to the selected display anchor is displayed in its entirety on the touchscreen display, and the pause is sustained at least until detecting an additional input to the touchscreen display. In some implementations, the method 400 includes determining and selecting at least one additional display anchor, as a second pause location in response to receiving additional input on the touchscreen. The additional display anchor selection can function to pause the scrolling of the plurality of inputs at the second pause location. The second pause can be sustained until additional input is received.

In some implementations, the method 400 includes receiving several subsequent inputs. For each input, the device 102 can determine a scroll behavior based on gestures associated with a portion of the subsequent inputs. In response to detecting a change in scroll behavior, the device 102 can adjust the predefined time period and store the adjusted predefined time period for device 102.

In some implementations, the inputs may correspond to a first touch location on the touchscreen display of device 102 and a lateral movement in a horizontal direction through the stream of content items horizontally displayed in the touchscreen display of device 102. The horizontal may be defined as perpendicular to a wide edge of the touchscreen display of device 102. In some implementations, the inputs may correspond to a second touch location on the touchscreen display of device 102 and a vertical movement through the stream of content items vertically displayed in the touchscreen display. The vertical being may be defined as parallel to the wide edge of the touchscreen display.

In some implementations, the electronic device (e.g., mobile computing device 102) is executing a messaging platform application and the messaging platform application can be configured to present the stream of content items to a user. In some implementations, the messaging platform application displays the stream of content items in a timeline. The timeline may indicate any number of content items and can be in a chronological time order or reverse chronological time order.

Figure 5:
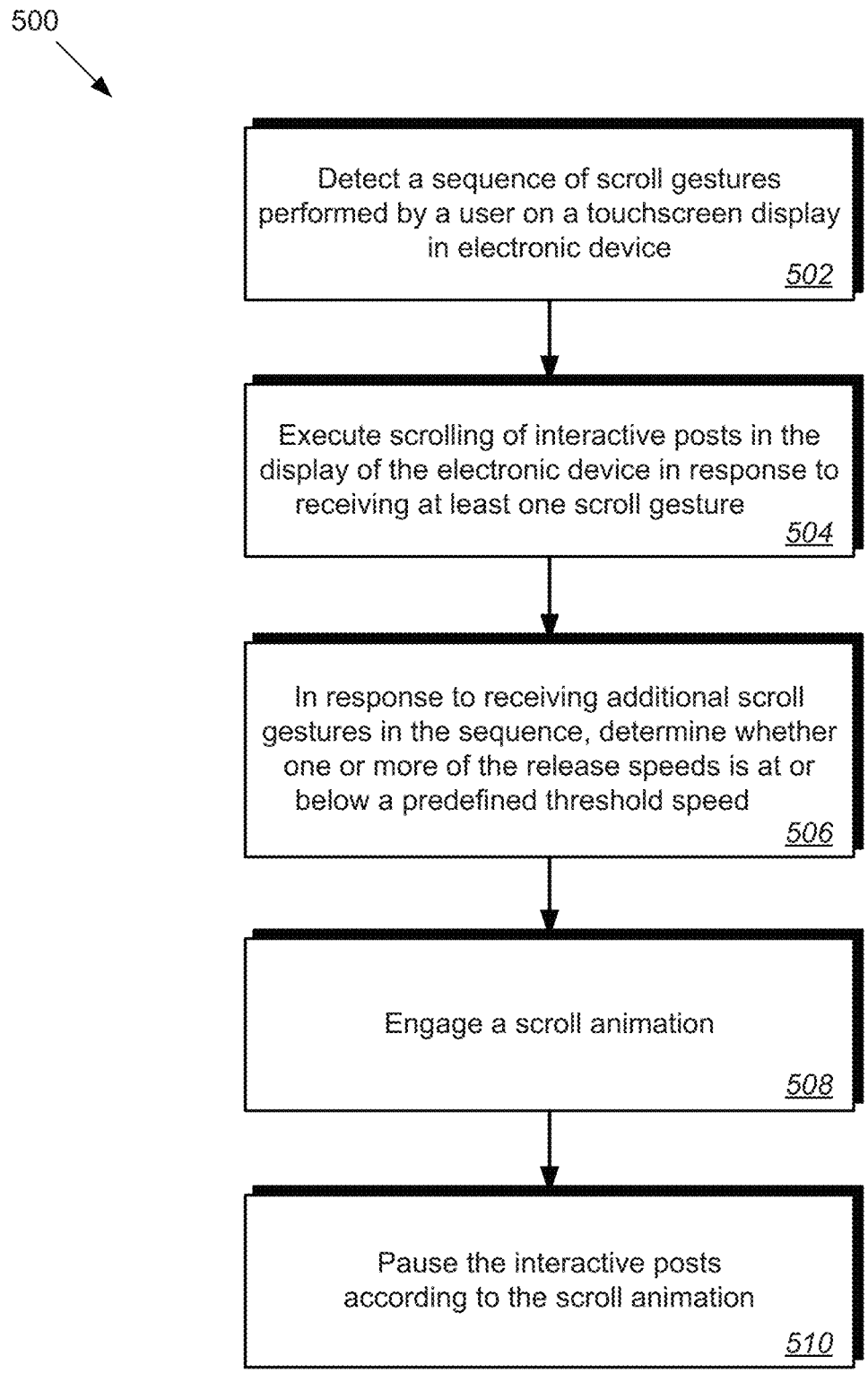
FIG. 5 is a flowchart that illustrates another example process of providing scrollable content in a display.

FIG. 5 is a flowchart that illustrates another example process 500 of providing scrollable content in a display. Process 500 may be executed by a consumer computing system, for example device 102 of FIGS. 1A/1B. Process 500 may include engaging a scroll animation for a content stream based on received scroll gestures.

The process 500 may include, at box 502, detecting a sequence of scroll gestures performed by a user on a touchscreen display in an electronic device. The sequence of scroll gestures may include, for example, one or more horizontal swipes or one or more vertical swipes on the touchscreen display. The sequence of scroll gestures may include, for example, any number of single finger selections on the touchscreen display.

At least a portion of the sequence of scroll gestures may include a contact location, a movement direction, and a release speed. The contact location may refer to a location on the touchscreen display in which a user selects to scroll content. The movement direction indicates which direction the user contact moved within the touchscreen display. For example, the user may swipe or flick up or down or left or right with each gesture.

In response to receiving at least one gesture in the sequence, the process 500 at box 504, may include executing scrolling of content (e.g., interactive posts) in the display of the electronic device. In response to receiving additional gestures in the sequence (e.g., a second and third gesture), the process 500 at box 506, may include determining whether one or more of the release speeds corresponding to the additional gestures is at or below a predefined threshold speed.

At box 508, the process 500 may include engaging a scroll animation for the interactive posts in response to detecting that at least one release speed corresponding to at least one of the additional gestures is at or below the predefined threshold speed. For example, the device 102 can configure a scroll animation, at box 510, to pause the interactive posts by selecting and arranging one interactive post in the display of the device 102 to begin at an edge of a viewable display area of the display device 102 after detecting a release speed for each scroll gesture is within a particular predefined release speed range.

In some implementations, the scroll animation for the interactive posts is configured to pause the scrolling of interactive posts by selecting a display anchor associated with at least one of the interactive posts scrollable in the display of the electronic device. The display anchor may define a content begin portion of the at least one interactive post. The scroll animation can move the selected display anchor to an edge of a viewable portion of the display of the device 102, for example, such that the content begin portion is aligned with the edge to provide the entirety of the at least one interactive post in the display of device 102.

In some implementations, the method 500 may include detecting a sequence of scroll gestures performed by a user on a touchscreen display in an electronic device. The sequence of scroll gestures may include any number of single finger selections on the touchscreen display. In some implementations, the sequence of scroll gestures includes multi-finger selections on the touchscreen display. At least a portion of the sequence of scroll gestures may include a contact location, a movement direction, and a release speed.

The method 500 may include scrolling of interactive posts in the display of the electronic device in response to receiving at least one gesture in the sequence. In response to receiving a second and third gesture in the sequence, the method 500 may include determining whether one or more of the release speeds corresponding to the second and third gestures is at or below a predefined threshold speed. The release speed may define a speed at which the user removes a touch input from the touchscreen display.

The method 500 may also include engaging a scroll animation for the interactive posts in response to detecting that at least one release speed corresponding to at least one of the second or third gestures being at or below the predefined threshold speed. The scroll animation for the interactive posts may be configured to pause the scrolling of interactive posts by selecting a display anchor associated with at least one of the interactive posts scrollable in the display of the electronic device and moving the selected display anchor to an edge of a viewable portion of the display of the electronic device such that the content begin portion is aligned with the edge to provide a top portion of the at least one interactive post in the display of the electronic device. As described above, a display anchor may define a content beginning or ending portion of the at least one interactive post.

The method 500 may also include scrolling the interactive posts according to the scroll animation. The scroll animation may include selecting and arranging at least one interactive post in the scrolling interactive posts in the display of the electronic device to begin at an edge of a viewable display area of the display of the electronic device after detecting a release speed for each respective scroll gesture.

Figure 6:
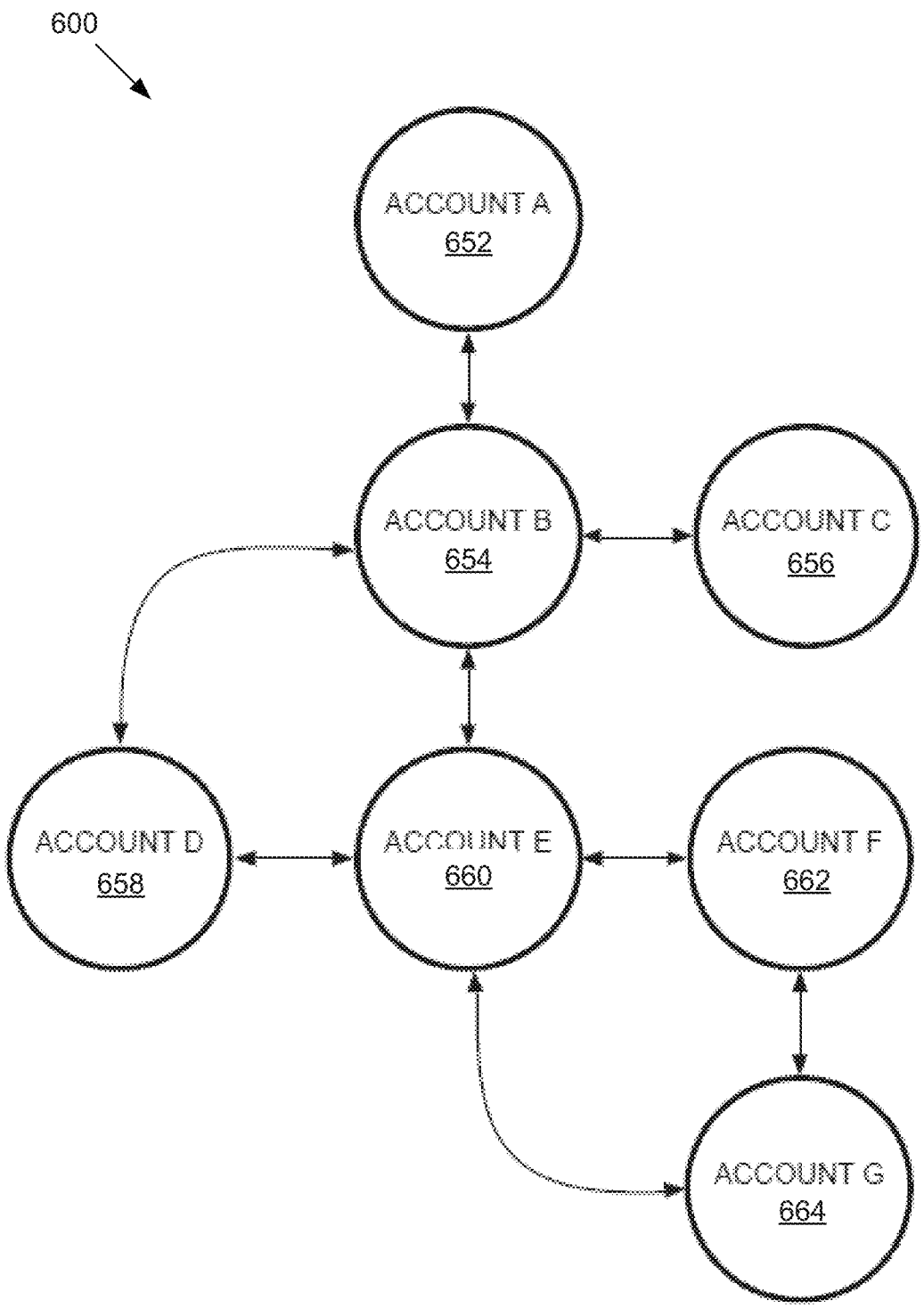
FIG. 6 shows an example depiction of a connection graph according to an implementation.

FIG. 6 shows an example depiction of a connection graph 650 according to an implementation. In one or more implementations, the connection graph 650 is a depiction of connection graph 168 of FIGS. 1A/1B, or connection graph 142 of FIGS. 1A/1B. As shown in FIG. 6, the connection graph 650 includes multiple components including nodes representing accounts of in a social media platform (i.e., Account A 652, Account B 654, Account C 656, Account D 658, Account E 660, Account F 662, and Account G 664) and edges connecting the various nodes.

The connection graph 650 is a data structure representing relationships (i.e., connections) between one or more accounts. The connection graph 650 represents accounts as nodes and relationships as edges connecting one or more nodes. A relationship may refer to any association between the accounts (e.g., following, friending, subscribing, tracking, liking, tagging, and/or etc.). The edges of the connection graph 650 may be directed and/or undirected based on the type of relationship (e.g., bidirectional, unidirectional), in accordance with various implementations described herein.

Many social media platforms include functionality to broadcast streams of messages to one or more accounts based at least partially on a connection graph representing relationships between those accounts. A stream may be a grouping of messages associated with one or more accounts or can reflect any arbitrary organization of messages that is advantageous for the user of an account. In accordance with various implementations described herein, a "message" is a container for content broadcasted/posted by or engaged by an account of a messaging platform. Messages can be authored by users and can include any number of content types (multimedia, text, photos, and video content, including a single video content file that includes a plurality of different video content segments, etc.).

Figure 7:
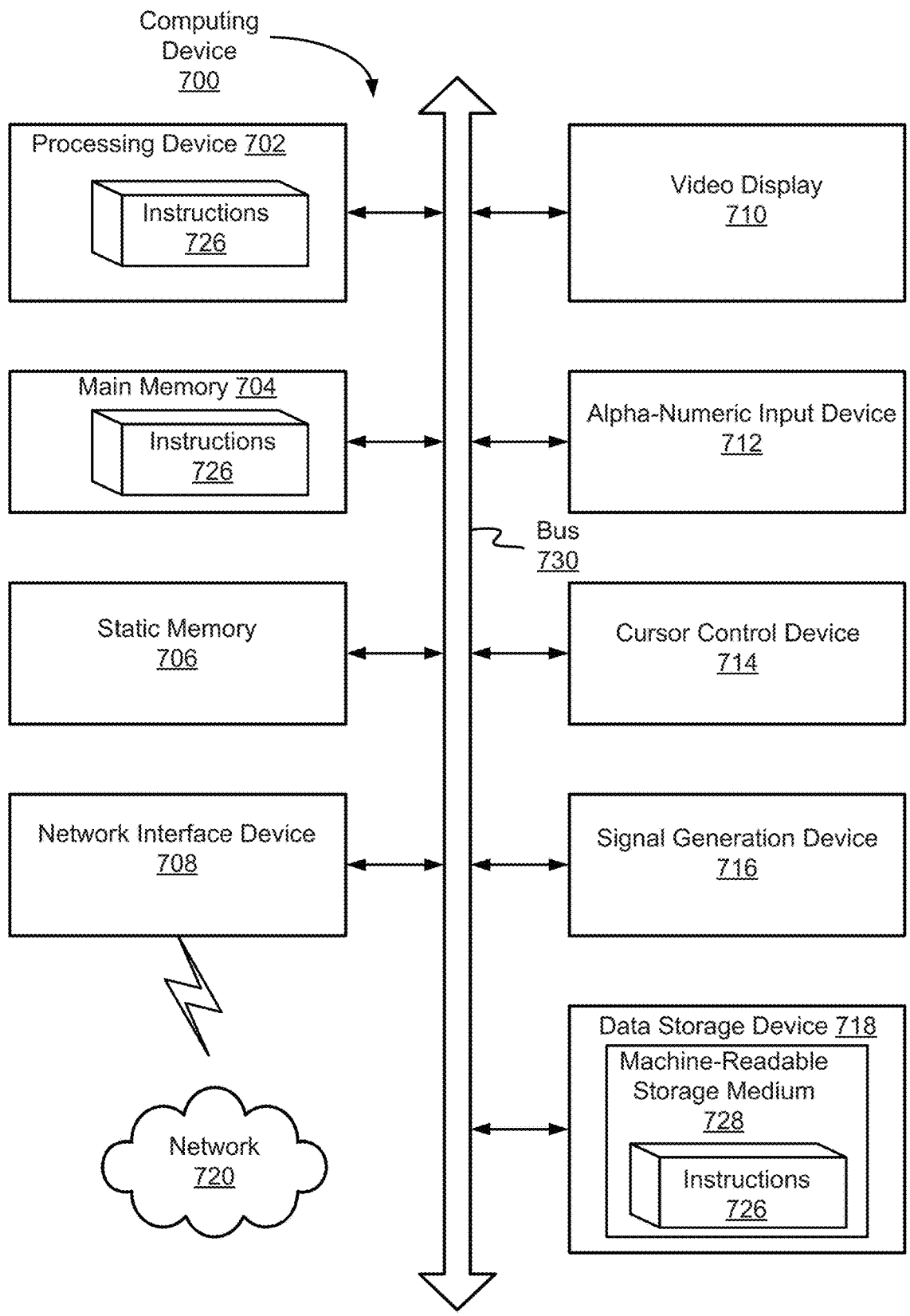
FIG. 7 shows an example of a computer device and a mobile computer device that can be used to implement the techniques described in this disclosure.

FIG. 7 illustrates a diagrammatic representation of a machine in the example form of a computing device 700 within which a set of instructions, for causing the machine to perform any one or more of the methodologies discussed herein, may be executed. The computing device 700 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 700 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM), a static memory 706 (e.g., flash memory, static random access memory (SRAM) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 (e.g., instructions for an application ranking system) for performing the operations and steps discussed herein.

The computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one implementation, the video display unit 710, the alphanumeric input device 712, and the cursor control device 714 may be combined into a single component or device (e.g., an LCD touch screen).

The data storage device 718 may include a computer-readable storage medium 728 on which is stored one or more sets of instructions 726 (e.g., instructions for the application ranking system) embodying any one or more of the methodologies or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 720 via the network interface device 708.

While the computer-readable storage medium 728 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    detecting a sequence of scroll gestures performed by a user on a touchscreen display in an electronic device, each of the scroll gestures including a contact location, a movement direction, and a release speed at which the user removes a touch input associated with the scroll gesture from the touchscreen display;
    in response to receiving a first gesture in the sequence, the release speed of the first gesture being greater than a predefined threshold speed, executing scrolling of a plurality of interactive posts in the touchscreen display;
    in response to receiving a second gesture in the sequence, determining whether the release speed of the second gesture is at or below the predefined threshold speed;
    in response to detecting that the release speed of the second gesture is at or below the predefined threshold speed, engaging a scroll animation for at least one of the interactive posts; and
    in response to the scroll animation being engaged, pausing, in the touchscreen display, the scrolling of the plurality of interactive posts, the engagement of the scroll animation triggering selecting and arranging at least one interactive post in the plurality of scrolling interactive posts in the touchscreen display to be aligned with an edge of the touchscreen display to provide the entirety of the at least one interactive post in the display of the device when the scrolling of the plurality of interactive posts is paused.

2. The computer-implemented method of claim 1, wherein engaging the scroll animation aligns the at least one interactive post based on a type of content in the at least one interactive post.

3. The computer-implemented method of claim 2, wherein:
    the edge is a top edge of the touchscreen display;
    the type of content includes image content; and
    engaging the scroll animation aligns the at least one interactive post to be centered between a left edge and a right edge of the touchscreen display.

4. The computer-implemented method of claim 1, wherein engaging the scroll animation moves the at least one interactive post into position and sinks or raises the at least one interactive post.

5. The computer-implemented method of claim 1, wherein engaging the scroll animation is configured to pause the scrolling of the plurality of interactive posts by,
    selecting a display anchor associated with at least one of the plurality of scrolling interactive posts in the touchscreen display, the display anchor defining a content beginning or ending portion of the at least one interactive post; and
    moving the selected display anchor to the edge such that the content begin portion is aligned with the edge to provide at least a top portion of the at least one interactive post in the touchscreen display.

6. A system comprising:
    at least one processor;
    a display device; and
    memory storing instructions that, when executed by the at least one processor, generate a user interface and cause the system to:
        detect a sequence of scroll gestures performed by a user on the display device, each of the scroll gestures including a contact location, a movement direction, and a release speed at which the user removes a touch input associated with the scroll gesture from the display device;
        in response to receiving a first gesture in the sequence, the release speed of the first gesture being greater than a predefined threshold speed, execute scrolling of a plurality of interactive posts in the display device;
        in response to receiving a second gesture in the sequence, determine whether the release speeds of the second gestures is at or below the predefined threshold speed;
        in response to detecting that the release speed of the second gesture at or below the predefined threshold speed, engage a scroll animation for at least one of the interactive posts; and
        in response to the scroll animation being engaged, pause, in the display device, the scrolling of the plurality of interactive posts, the engagement of the scroll animation triggering selecting and arranging at least one interactive post in the plurality of scrolling interactive posts in the display device to be aligned with a display edge of the display device to provide the entirety of the at least one interactive post in the display of the device when the scrolling of the plurality of interactive posts is paused .

7. The system of claim 6, wherein engaging the scroll animation aligns the at least one interactive post based on a type of content in the at least one interactive post.

8. The system of claim 7, wherein:
    the display edge is a top edge of the display device;

the type of content includes image content; and engaging the scroll animation aligns the at least one interactive post to be centered between a left edge and a right edge of the display device.

9. The system of claim 6, wherein engaging the scroll animation moves the at least one interactive post into position and sinks or raises the at least one interactive post.

10. The system of claim 6, wherein engaging the scroll animation is configured to pause the scrolling of the plurality of interactive posts by, selecting a display anchor associated with at least one of the plurality of scrolling interactive posts in the display device, the display anchor defining a content beginning or ending portion of the at least one interactive post; and moving the selected display anchor to the display edge such that the content begin portion is aligned with the display edge to provide at least a top portion of the at least one interactive post in the display device.

11. The system of claim 6, wherein the sequence of scroll gestures includes a plurality of single finger selections on the display device.

12. The system of claim 6, wherein the sequence of scroll gestures includes a plurality of multi-finger selections on the display device.

13. A non-transitory computer-readable medium comprising instructions that, when executed, are configured to cause at least one processor to:

detect a sequence of scroll gestures performed by a user on a touchscreen display in an electronic device, each of the scroll gestures including a contact location, a movement direction, and a release speed at which the user removes a touch input associated with the scroll gesture from the touchscreen display;

in response to receiving a first gesture in the sequence, the release speed of the first gesture being greater than a predefined threshold speed, execute scrolling of a plurality of interactive posts in the touchscreen display;

in response to receiving a second gesture in the sequence, determine whether a release speed of the second gesture is at or below the predefined threshold speed;

in response to detecting that the release speed of the second gesture is at or below the predefined threshold speed, engage a scroll animation for at least one of the interactive posts; and in response to the scroll animation being engaged, pause, in the touchscreen display, the plurality of interactive posts according to the scroll animation, the scroll animation triggering selecting and arranging at least one interactive post in the plurality of scrolling interactive posts in the touchscreen display to be aligned with an edge of the touchscreen display to provide the entirety of the at least one interactive post in the display of the device when the scrolling of the plurality of interactive posts is paused.

14. The computer-readable medium of claim 13, wherein engaging the scroll animation aligns the at least one interactive post based on a type of content in the at least one interactive post.

15. The computer-readable medium of claim 14, wherein:
the edge is a top edge of the touchscreen display;
the type of content includes image content; and
engaging the scroll animation aligns the at least one interactive post to be centered between a left edge and a right edge of the touchscreen display.

16. The computer-readable medium of claim 13, wherein engaging the scroll animation moves the at least one interactive post into position and sinks or raises the at least one interactive post.

17. The computer-readable medium of claim 13, wherein engaging the scroll animation is configured to pause the scrolling of the plurality of interactive posts by, selecting a display anchor associated with at least one of the plurality of scrolling interactive posts in the touchscreen display, the display anchor defining a content beginning or ending portion of the at least one interactive post; and in response to the scroll animation being engaged, moving the selected display anchor to the edge such that the content begin portion is aligned with the edge to provide at least a top portion of the at least one interactive post in the touchscreen display when the scrolling of the plurality of interactive posts is paused.

* * * * *